United States Patent
Miki et al.

(10) Patent No.: US 9,525,528 B2
(45) Date of Patent: *Dec. 20, 2016

(54) TRANSMISSION APPARATUS AND RADIO RESOURCE ASSIGNMENT METHOD

(71) Applicant: NTT DOCOMO, INC., Tokyo (JP)

(72) Inventors: Nobuhiko Miki, Kanagawa (JP);
Motohiro Tanno, Kanagawa (JP);
Kenichi Higuchi, Kanagawa (JP);
Mamoru Sawahashi, Kanagawa (JP);
Hiroyuki Atarashi, Kanagawa (JP)

(73) Assignee: NTT DOCOMO, INC., Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 14/515,329

(22) Filed: Oct. 15, 2014

(65) Prior Publication Data

US 2015/0063292 A1    Mar. 5, 2015

Related U.S. Application Data

(63) Continuation of application No. 11/909,696, filed as application No. PCT/JP2006/305518 on Mar. 20, 2006.

(30) Foreign Application Priority Data

Mar. 31, 2005  (JP) ................................. 2005-105493
Jun. 14, 2005  (JP) ................................. 2005-174403

(51) Int. Cl.
*H04L 5/00*     (2006.01)
*H04B 7/26*     (2006.01)
(Continued)

(52) U.S. Cl.
CPC ........... *H04L 5/0039* (2013.01); *H04B 7/2615* (2013.01); *H04L 1/1845* (2013.01);
(Continued)

(58) Field of Classification Search
CPC ..................... H04W 72/0446; H04W 72/0453; H04L 5/00–5/0012; H04L 5/0037; H04L 5/0041

See application file for complete search history.

(56) References Cited

U.S. PATENT DOCUMENTS 6,741,618 B1    5/2004   Chang et al.
7,095,708 B1    8/2006   Alamouti et al.
(Continued)

FOREIGN PATENT DOCUMENTS

EP    1612980 A1    1/2006
JP    2001-230744   8/2001
(Continued)

OTHER PUBLICATIONS

Office Action issued in corresponding U.S. Appl. No. 11/909,696 dated Sep. 29, 2015 (10 pages).
(Continued)

*Primary Examiner* — Pao Sinkantarakorn
(74) *Attorney, Agent, or Firm* — Osha Liang LLP

(57) ABSTRACT

A transmission apparatus is provided with radio resource assignment means that assigns radio resources to each physical channel according to a type of the physical channel; and transmission means that transmits information to be transmitted by each physical channel using the assigned radio resources.

5 Claims, 42 Drawing Sheets

(51) Int. Cl.
*H04L 1/18* (2006.01)
*H04W 72/04* (2009.01)
*H04J 4/00* (2006.01)
*H04L 1/00* (2006.01)
*H04W 72/08* (2009.01)

(52) U.S. Cl.
CPC .......... *H04L 5/0007* (2013.01); *H04L 5/0058* (2013.01); *H04W 72/044* (2013.01); *H04J 4/00* (2013.01); *H04L 1/0003* (2013.01); *H04L 1/0009* (2013.01); *H04L 1/1867* (2013.01); *H04L 5/006* (2013.01); *H04L 5/0016* (2013.01); *H04L 5/0064* (2013.01); *H04L 5/0091* (2013.01); *H04W 72/085* (2013.01)

(56) References Cited

U.S. PATENT DOCUMENTS

| | | | |
|---|---|---|---|
| 7,660,367 | B2 | 2/2010 | Nishio et al. |
| 2003/0012220 | A1 | 1/2003 | Kim et al. |
| 2003/0174643 | A1 | 9/2003 | Ro et al. |
| 2004/0001429 | A1 | 1/2004 | Ma et al. |
| 2004/0081131 | A1 | 4/2004 | Walton et al. |
| 2004/0228267 | A1 | 11/2004 | Agrawal et al. |
| 2006/0018279 | A1* | 1/2006 | Agrawal ............ H04B 7/2656 370/330 |
| 2006/0093067 | A1 | 5/2006 | Jalali et al. |

FOREIGN PATENT DOCUMENTS

| | | |
|---|---|---|
| JP | 2001-244913 | 9/2001 |
| JP | 2002-335556 | 11/2002 |
| JP | 2003-101499 A | 4/2003 |
| JP | 2003-264524 A | 9/2003 |
| JP | 2004-207983 A | 7/2004 |
| JP | 2004-312291 A | 11/2004 |
| JP | 2005-045561 | 2/2005 |
| JP | 2005-117579 A | 4/2005 |
| KR | 20000014425 A | 3/2000 |
| WO | 00/72608 A2 | 11/2000 |
| WO | 0205506 A2 | 1/2002 |
| WO | 2004091126 A1 | 10/2004 |
| WO | 2005025091 A1 | 3/2005 |

OTHER PUBLICATIONS

Extended European Search Report issued in corresponding European Application No. 15187882.4 dated Jan. 19, 2016 (14 pages).
Office Action issued in corresponding U.S. Appl. No. 11/909,696 dated Apr. 8, 2015 (9 pages).
International Search Report issued in PCT/JP2006/305518, mailed on Jun. 27, 2006, with translation (5 pages).
W.Wang et al., "Impact of Multiuser Diversity and Channel Variability on Adaptive OFDM", IEEE VTC2003-Fall, pp. 547-551, Oct. 2003 (5 pages).
J.A.C. Bingham, "Multicarrier Modulation for Data Transmission: An Idea Whose Time Has Come", IEEE Communications Magazine, pp. 5-14, May 1990 (8 pages).
H. Atarashi et al., "Variable Spreading Factor-Orthogonal Frequency and Code Division Multiplexing (VSF-OFCDM) for Broadband Packet Wireless Access", IEICE Trans. Commun., vol. E86-B, No. 1, Jan. 2003, pp. 291-299 (9 pages).
Office Action for Japanese Application No. 2005-174403, mailed on May 12, 2009 (4 pages).
3GPP TR 25.892 v1.2.0, 3rd Generation Partnership Project; Technical Specification Group Radio Access Network; Feasibility Study for OFDM for UTRAN enhancement; (Release 6) Jun. 2004 (94 pages).
Russian Office Action for Application No. 2007136029/09, mailed on Feb. 25, 2010 (8 pages).
English abstract for Korean Publication No. 20000014425, publication date Mar. 15, 2000, esp@cenet database, (1 page).
Japanese Office Action for Application No. 2009-163542, mailed on Jun. 28, 2011 (4 pages).
Extended European Search Report for Application No. 06729486.8, mailed on Mar. 7, 2012 (13 pages).
Japanese Office Action for Application No. 2009-163542, mailed on Feb. 14, 2012 (6 pages).
Chinese Office Action for Application No. 201110099755.8, mailed on Aug. 3, 2012 (10 pages).
Office Action for European Application No. 12178826.9 dated Oct. 17, 2012 (15 pages).

* cited by examiner

FIG.2

| PHYSICAL CHANNEL CLASSIFICATION | CONCRETE TRANSMISSION DATA CONTENTS |
|---|---|
| COMMON CONTROL CHANNEL | ➤ BROADCAST INFORMATION<br>➤ PAGING INFORMATION ETC. |
| CONTROL SIGNALING CHANNEL | ➤ CONTROL INFORMATION OF PHYSICAL LAYER<br>  ✓ MODULATION SCHEME IN ADAPTIVE MODULATION, INFORMATION OF CODING RATE<br>  ✓ ASSIGNMENT OF RADIO RESOURCES (SYMBOL, SUB-CARRIER) INFORMATION<br>➤ CONTROL INFORMATION OF LAYER 2<br>  ✓ INFORMATION OF RETRANSMISSION CONTROL OF PACKET<br>  ✓ ASSIGNMENT INFORMATION OF PACKET SCHEDULING ETC. |
| SHARED CHANNEL | ➤ TRAFFIC DATA FROM EACH USER<br>➤CONTROL SIGNAL DATA USING SIGNAL OF UPPER LAYER FROM EACH USER, ETC. |
| MULTICAST CHANNEL | MULTICAST |

FIG.4

| RECEIVING QUALITY LEVEL | | DATA MODULATION SCHEME | CODING RATE |
|---|---|---|---|
| bad | $X_1$ | QPSK | 1/9 |
| | $X_2$ | QPSK | 1/7 |
| | $X_3$ | QPSK | 1/5 |
| | $X_4$ | QPSK | 1/3 |
| | $X_5$ | QPSK | 1/2 |
| | $X_6$ | QPSK | 3/4 |
| | $X_7$ | 16QAM | 1/2 |
| | $X_8$ | 16QAM | 3/4 |
| good | $X_9$ | 64QAM | 3/4 |

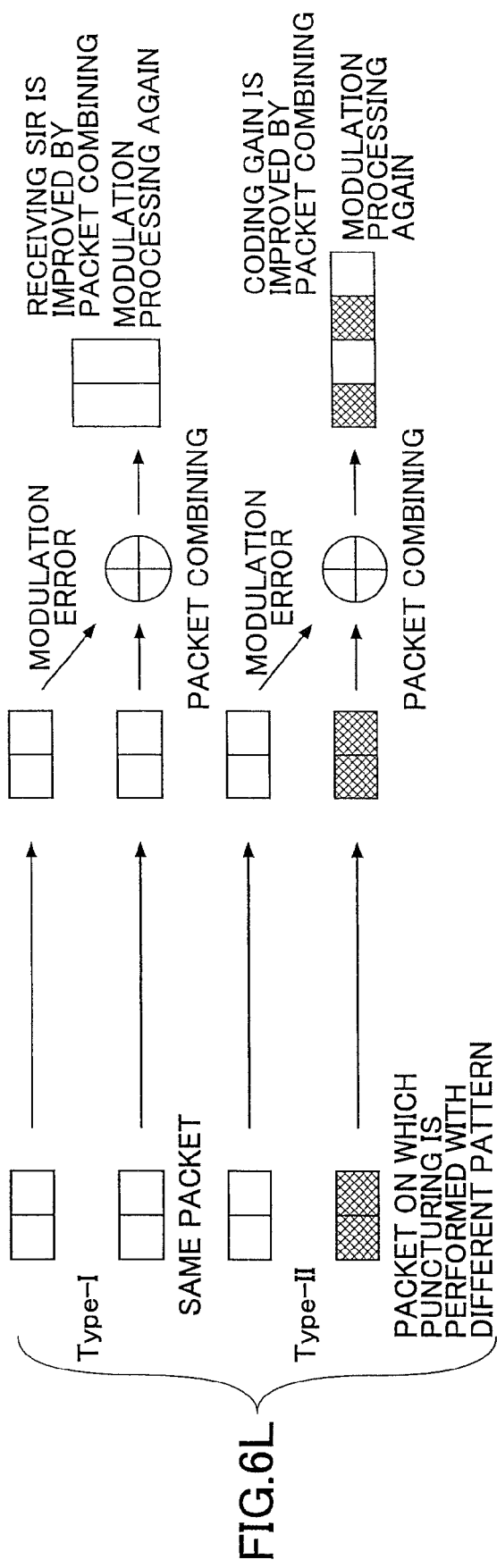

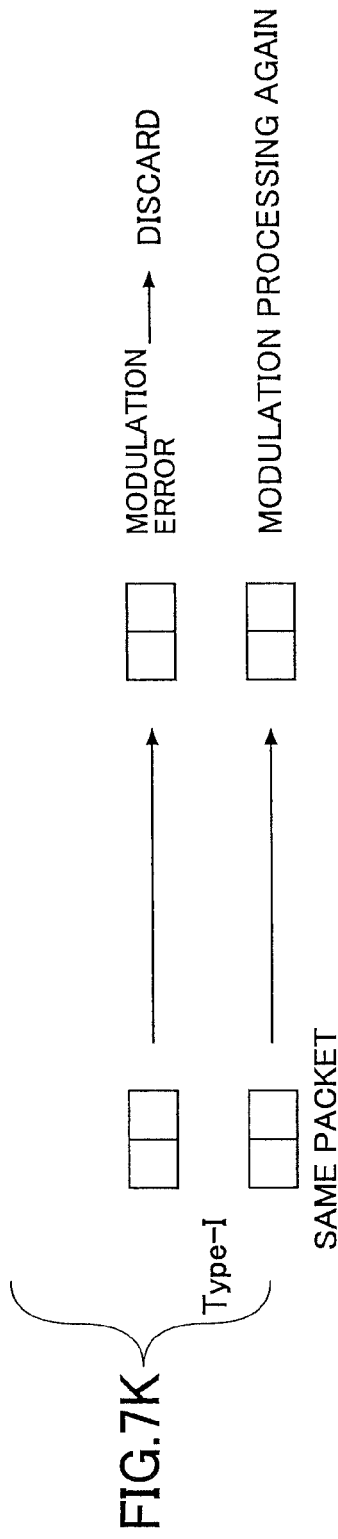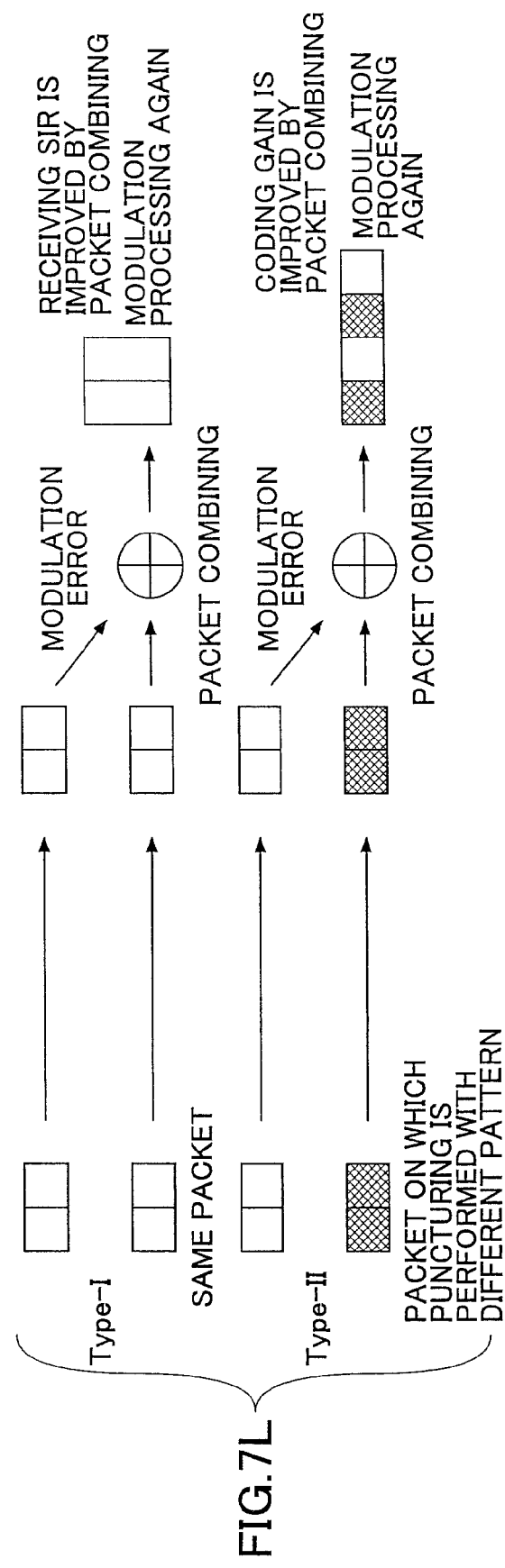

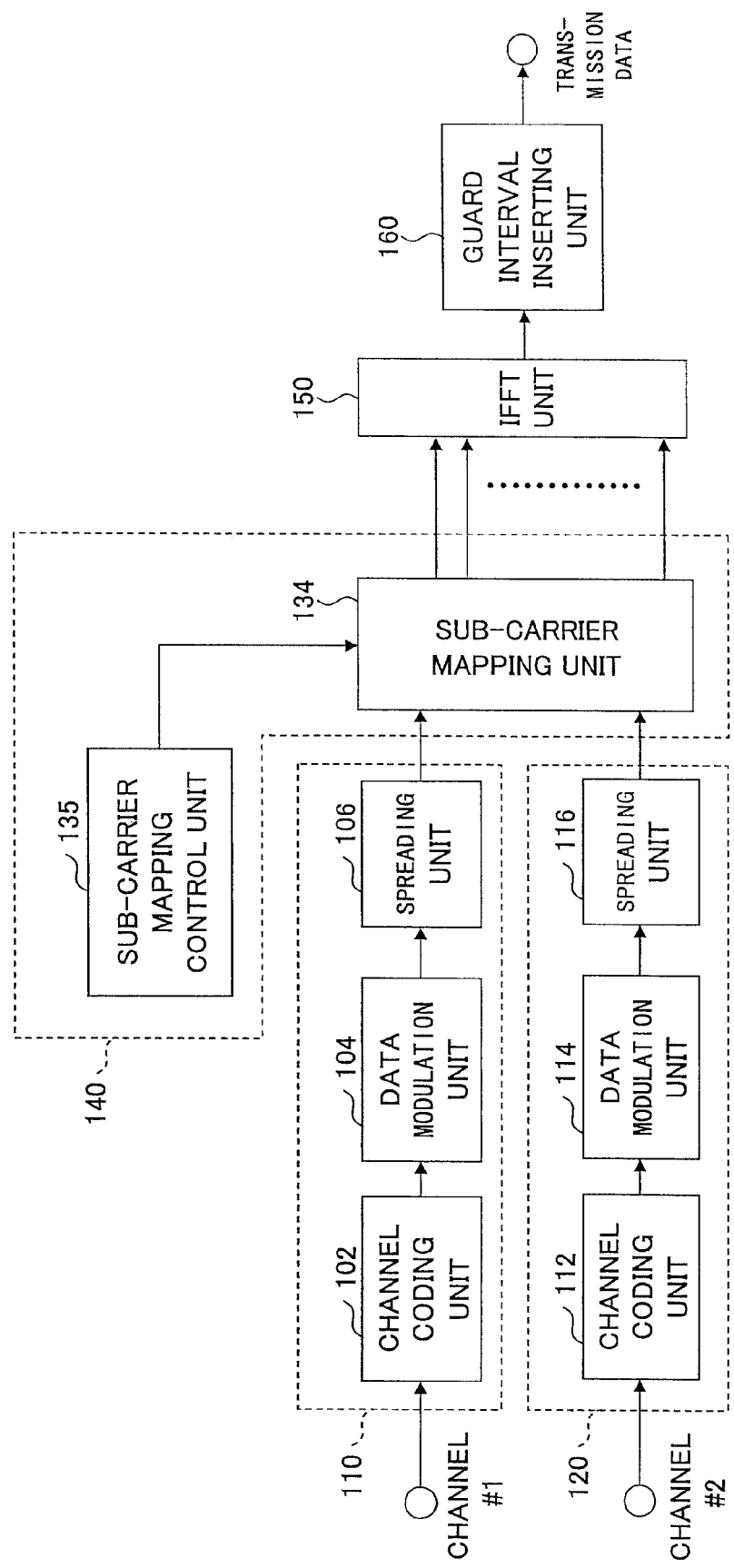

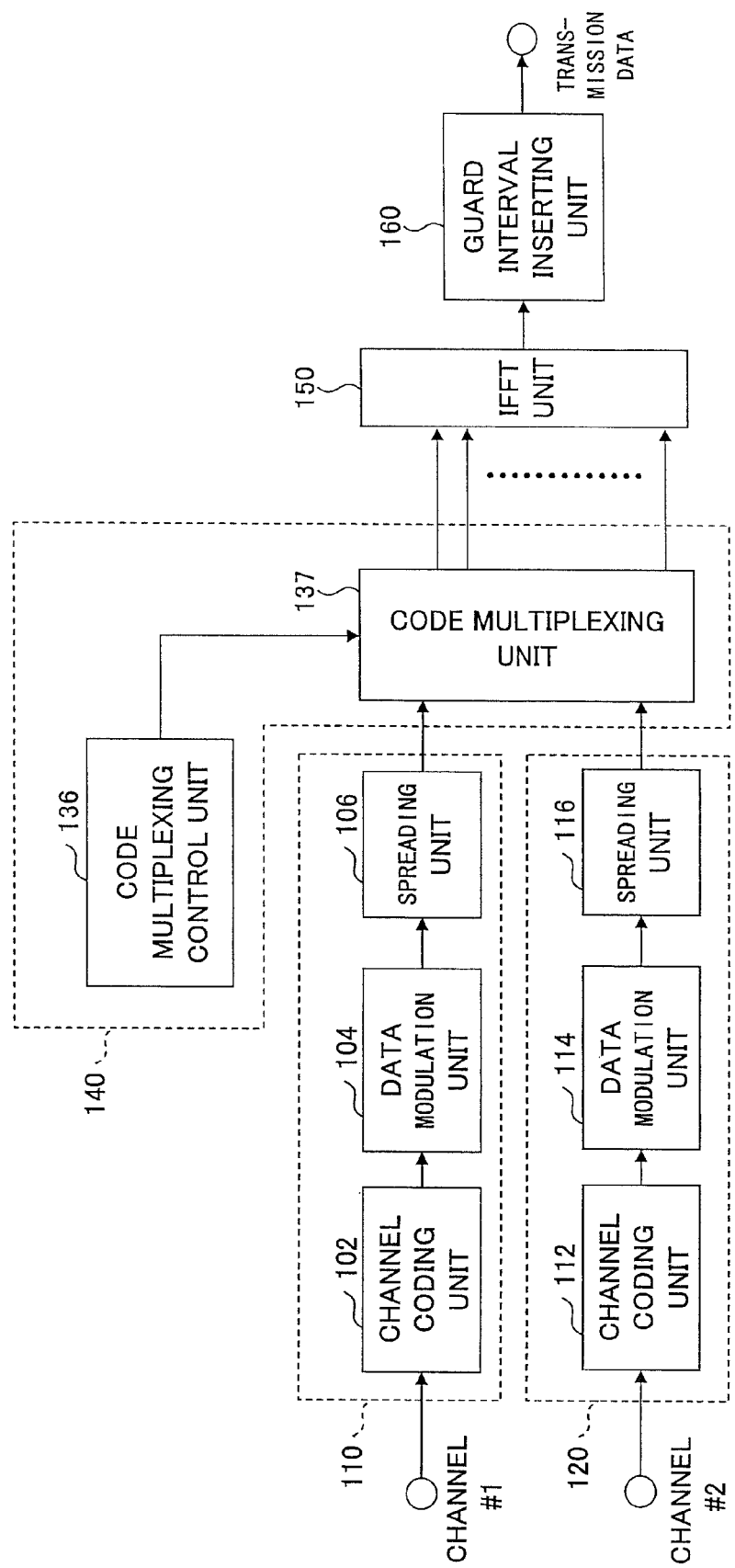

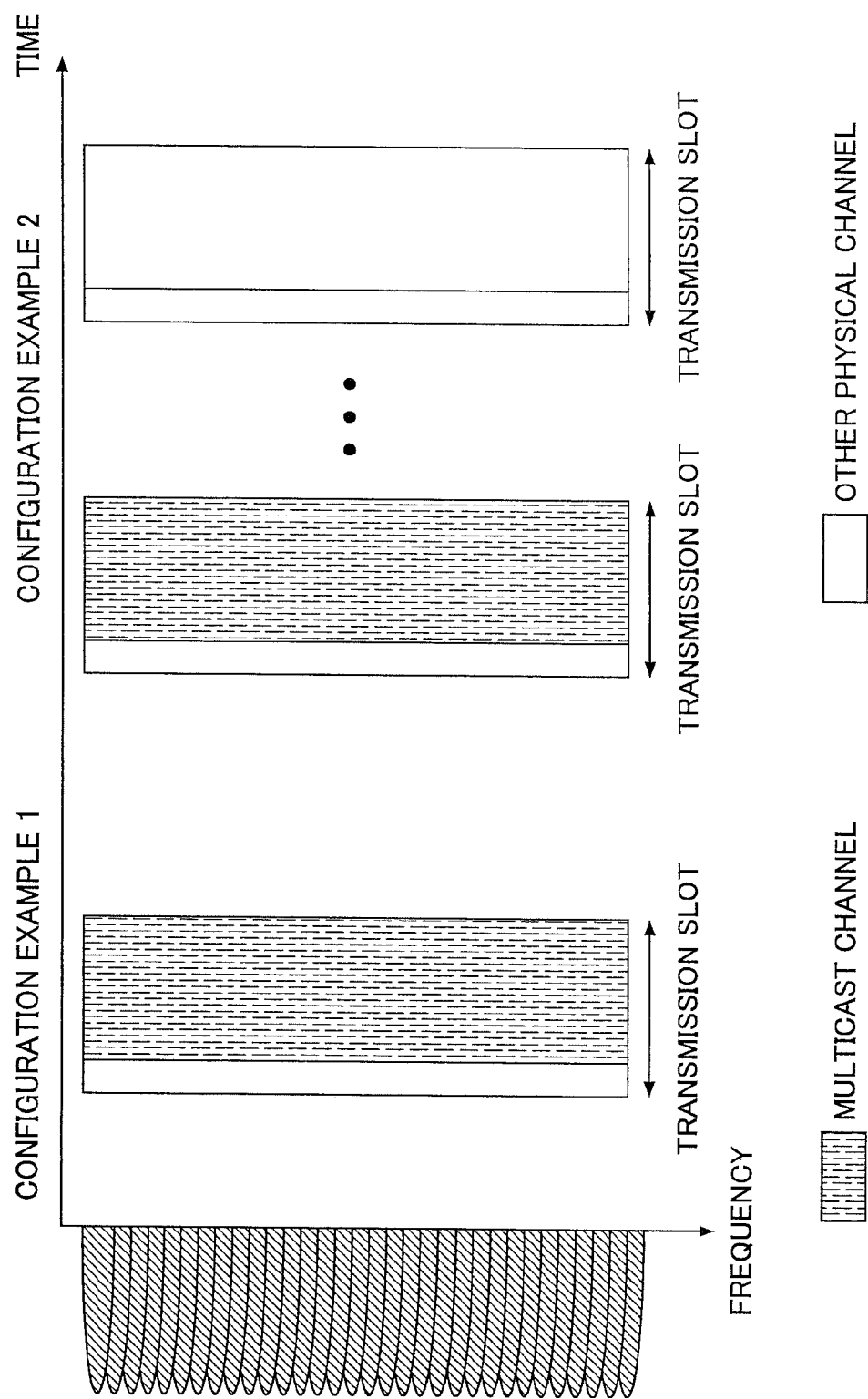

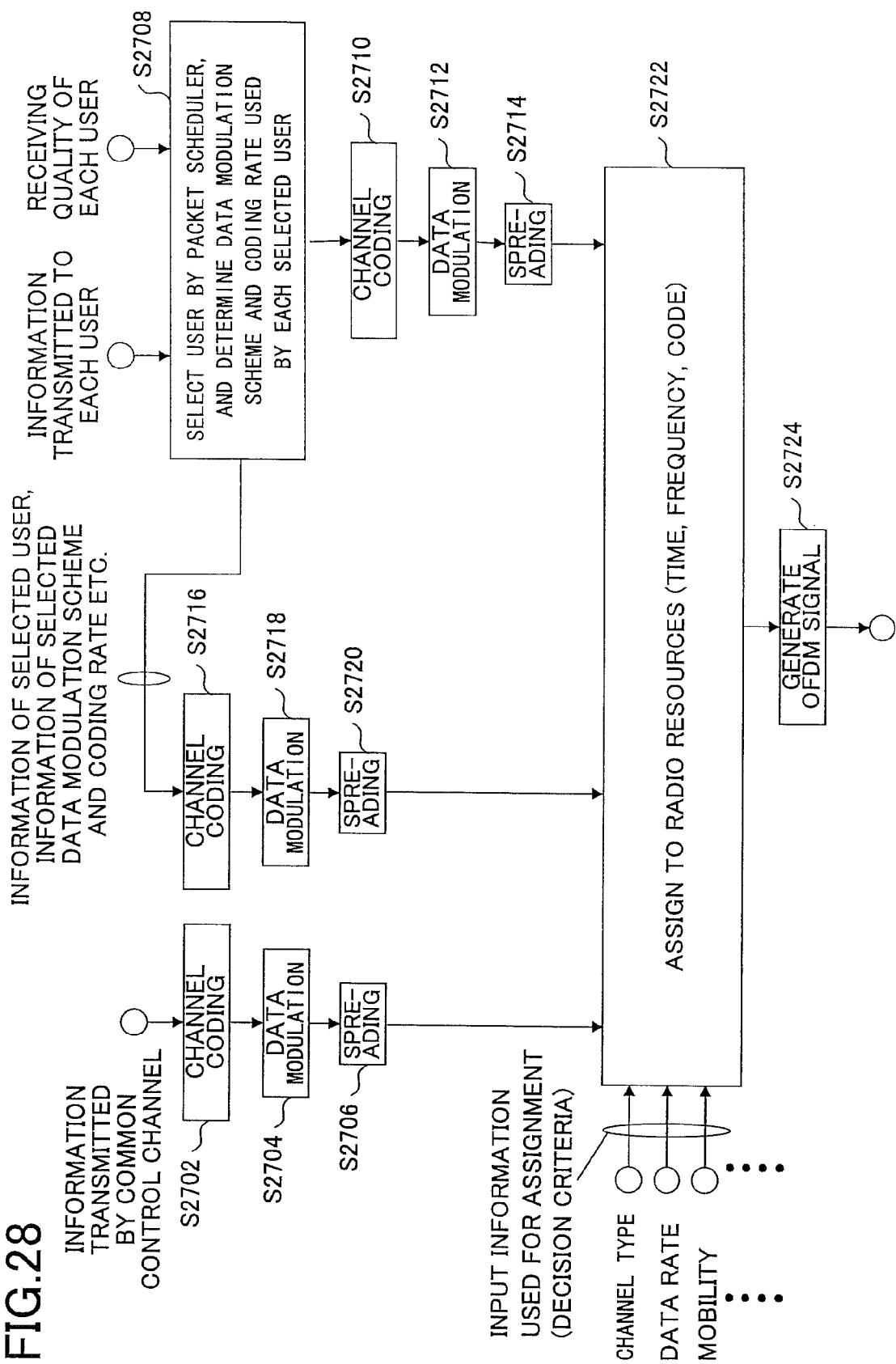

TRANSMISSION APPARATUS AND RADIO RESOURCE ASSIGNMENT METHOD

CROSS-REFERENCE TO RELATED APPLICATIONS

This Application is a Continuation of application Ser. No. 11/909,696 filed on Sep. 25, 2007, which is a national phase of Application PCT/JP2006/305518 which claims priority for Application 2005-105493 filed on Mar. 31, 2005 in Japan and Application 2005-174403 filed on Jun. 14, 2005 in Japan.

TECHNICAL FIELD

The present invention relates to a transmission apparatus and a radio resource assignment method.

BACKGROUND ART

In UMTS (Universal Mobile Telecommunications System) scheme that is one of the third generation mobile communication schemes (3G), HSDPA (High Speed Downlink Packet Access) is standardized as a scheme for realizing high speed packet transmission in a link (to be referred to as a downlink hereinafter) from a base station to a mobile station.

In the HSDPA, for increasing throughput that can be realized, a packet scheduling technique is adopted in which users connecting to the base station share radio resources (to be referred to as a shared packet channel hereinafter), and the base station assigns the radio resources to a user having good propagation state on a priority basis.

In HSDPA, single carrier signal transmission is performed in a 5 MHz channel bandwidth. Thus, the entire channel bandwidth of 5 MHz is used for data that is signal-transmitted by the shared packet channel, and assignment of transmission slots to each user is performed based on time multiplexing basically. In addition, also for a control channel for reporting which user is assigned the transmission slot and the like for realizing this shared packet channel transmission, signal transmission is performing using the entire channel bandwidth of 5 MHz.

On the other hand, consideration of standardization on long term evolution (LTE) of the UMTS is started, and study of the fourth generation mobile communication scheme (4G) that is a mobile communication scheme of a next generation of 3G is being progressed. In the LTE of 3G and the 4G schemes, it is desired to flexibly support from a multi-cell environment such as cellular systems to an isolated-cell environment such as hot spot areas and indoor areas, and further desired to increase frequency use efficiency for both of the cell environments.

As a radio access scheme adopted for a downlink in the LTE of 3G and the 4G schemes, it is considered that OFDM (Orthogonal Frequency Division Multiplexing) for transmitting signals using many sub-carriers is a strong candidate (refer to non-patent document 1, for example).

In the OFDM, serial to parallel conversion is performed on a data series to be transmitted, so that parallel signals of the data series are transmitted using a plurality of sub-carriers. Accordingly, since a symbol rate becomes low, effects of delayed waves (multi-path) caused due to difference of propagation routes from a transmitter to a receiver is suppressed, so that it becomes possible to transmit a signal of high information rate with high quality.

In addition, for supporting the multi-cell environment by the radio access scheme using the OFDM, it is desirable to apply one-cell frequency reuse for realizing large capacity. For realizing the one-cell frequency reuse, application of spreading is effective to suppress effects of interference signals using the same frequency from surrounding adjacent cells.

Thus, in OFDM (OFDM with Spreading) to which spreading is applied, as shown in FIGS. 1A and 1B, after the input data is channel-coded and data-modulated, spreading is applied, and serial to parallel conversion and inverse Fourier conversion are performed, so that signals of multi-carriers are generated and are transmitted after a guard interval is inserted. More particularly, as a case where spreading is applied, when 8 is applied as a spreading factor for example, each symbol is spread into eight sub-carries and is transmitted. In addition, when effects of interference from surrounding cells are small, 1 is applied as a spreading factor since it is unnecessary to apply spreading, so that data $D_1, D_2, \ldots$ that are different in each sub-carrier are transmitted.

Also in OFDM or OFDM to which spreading is applied as mentioned above, the packet scheduling technique can be applied using a shared channel like one used in HSDPA, and throughput can be increased accordingly. In this case, since multi-carrier transmission is performed in OFDM for shared channel transmission, not only a method for performing transmission slot assignment to each user by time multiplexing like HSDPA is available but also it is available to assign radio resources to each user in units of a sub-carrier or in units of a frequency block in which a plurality of sub-carriers are bound (refer to non-patent document 2, for example).

Therefore, when performing signal transmission using multi-carrier transmission within a channel bandwidth, a method for assigning radio resources different from one for HSDPA becomes possible.

However, in order to realize actual mobile communication in OFDM or OFDM using spreading, in addition to transmitting the shared channel, it is necessary to transmit a control channel necessary for transmitting control information of the shared channel or transmit a common control channel for transmitting system information and paging information that are transmitted to all users connected to a base station.

[Non-patent document 1] J. A. C. Bingham, "Multicarrier modulation for data transmission: an idea whose time has come," IEEE Commun. Mag., pp. 5-14, May 1990.

[Non-patent document 2] W. Wang, T. Ottosson, M. Sternad, A. Ahlen, A. Svensson, "Impact of multiuser diversity and channel variability on adaptive OFDM," IEEE VTC2003-Fall, pp. 547-551, October 2003.

DISCLOSURE OF THE INVENTION

Problem to be Solved by the Invention

However, in the above-mentioned multi-carrier transmission for performing signal transmission using a plurality of sub-carriers, there is a following problem.

There is a problem, in a downlink, that it is not determined that how radio resources are optimally assigned to physical channels for transmitting different types of information.

An object of the present invention is to provide a transmission apparatus and a radio resource assignment method that can assign radio resources according to types of physical channels.

Means for Solving the Problem

To solve the above problem, a transmission apparatus, as one feature, includes:

radio resource assignment means that assigns radio resources to each physical channel according to a type of the physical channel; and transmission means that transmits information to be transmitted by each physical channel using the assigned radio resources.

By adopting a configuring like this, radio resources can be assigned according to types of physical channels.

As to a radio resource assignment method of the present invention, a radio resource assignment method in a transmission apparatus for transmitting a plurality of sub-carriers, as one feature, includes:

a step of receiving information indicating receiving quality;

a step of determining a user for transmission based on the receiving quality;

a step of assigning radio resources to each physical channel according to a type of the physical channel; and a step of transmitting information to be transmitted by each physical channel using the assigned radio resources to the user.

Accordingly, radio resources can be assigned according to types of physical channels so that information to be transmitted by each physical channel can be transmitted to users.

Effect of the Invention

According to an embodiment of the present invention, a transmission apparatus and a radio resource assignment method that can assign radio resources according to types of physical channels can be realized.

BRIEF DESCRIPTION OF THE DRAWINGS

FIG. 4 is an explanatory diagram showing combinations of receiving quality levels, data modulation schemes and coding rates;

FIG. 6K is an explanatory diagram showing radio resource assignment to the common control channel;

FIG. 6L is an explanatory diagram showing radio resource assignment to the common control channel;

FIG. 7K is an explanatory diagram showing radio resource assignment to the control signaling channel;

FIG. 7L is an explanatory diagram showing radio resource assignment to the control signaling channel;

FIG. 10 is a block diagram showing a transmission apparatus of an embodiment of the present invention;

FIG. 12 is a block diagram showing a transmission apparatus of an embodiment of the present invention;

FIG. 18 is an explanatory diagram showing radio resource assignment to a multicast channel and other physical channels;

FIG. 28 is a flowchart showing operation of a transmission apparatus of an embodiment of the present invention.

DESCRIPTION OF REFERENCE SIGNS 100 transmission apparatus

PREFERRED EMBODIMENTS FOR CARRYING OUT THE INVENTION

Next, embodiments of the present invention are described with reference to drawings. By the way, in all drawings for explaining the embodiments, same reference signs are used for units having same function, and repeated description is not given.

Figure 1:
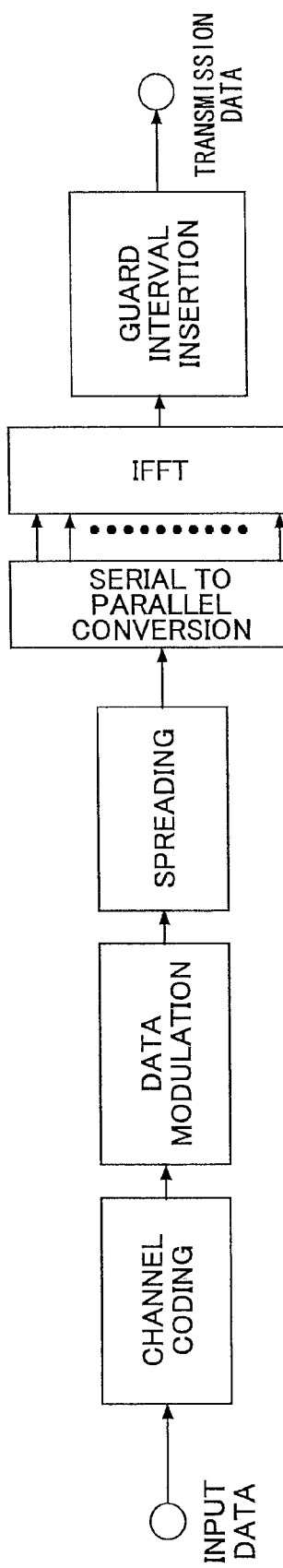
FIG. 1A is an explanatory diagram showing an OFDM communication scheme to which spreading is applied.
FIG. 1B is an explanatory diagram showing an OFDM communication scheme to which spreading is applied.
Figure 2:
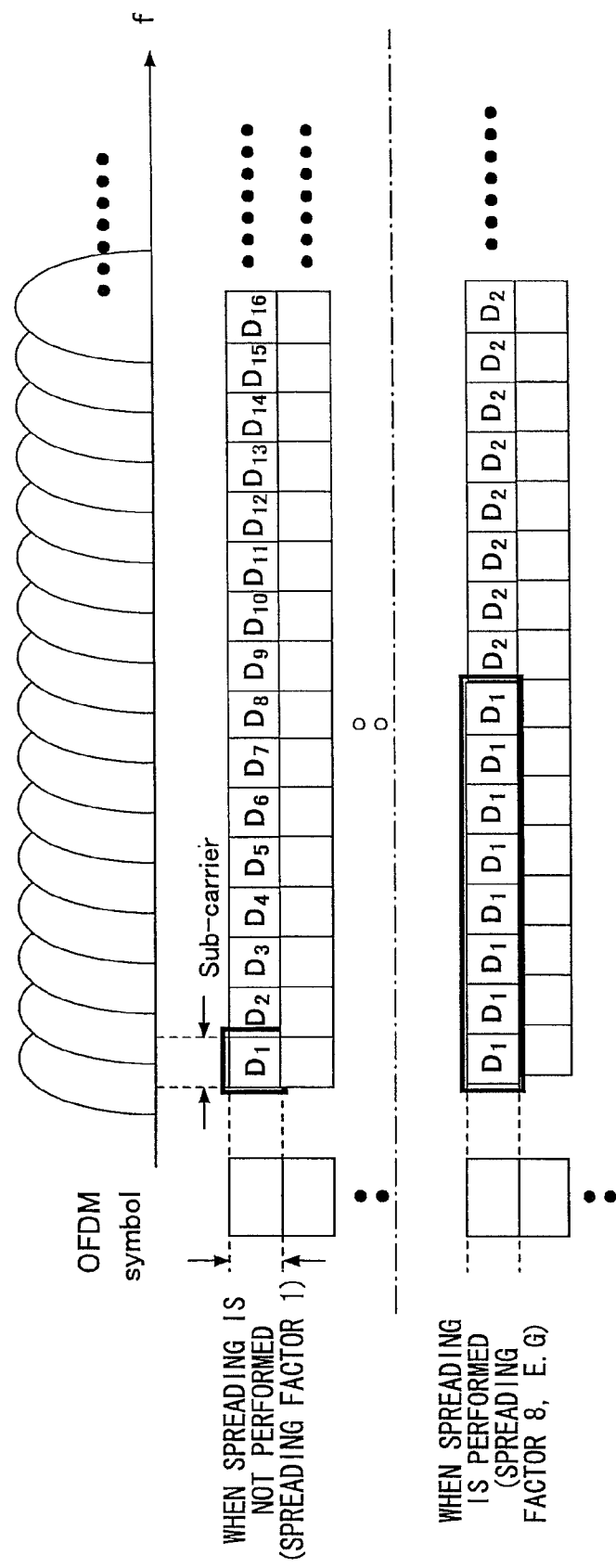
FIG. 2 is an explanatory diagram showing classification of physical channels.

First, a physical channel in the downlink intended for embodiments of the present invention is described with reference to FIG. 2.

The physical channel in the downlink intended for the embodiments of the present invention is classified into a common control channel, a shared channel, a channel (to be referred to as control signaling channel, hereinafter) for transmitting control information of the physical layer and control information of the layer 2, and a multicast channel.

The common control channel is a channel for performing transmission for the whole of a cell covered by a base station, for example, the common control channel transmits broadcast information, paging information and the like.

The shared channel is for transmitting traffic data to each user, control signal data using a signal of an upper layer and the like. For example, as the control signal using the signal of the upper layer, there is ACK/NACK indicating presence or absence of a receiving error in TCP/IP.

The control signaling channel transmits, as control information in the physical layer, information of modulation scheme and coding rate in adaptive modulation, for example. In addition, the control signaling channel transmits, as control information of the physical layer, radio resource assignment information such as information indicating which symbol or sub-carrier is assigned, for example.

In addition, the control signaling channel transmits, as control information of the layer 2, information of packet retransmission control, for example. In addition, the control signaling channel transmits, as control information of the layer 2, assignment information of packet scheduling, for example.

The multicast channel is a channel for multicast.

Figure 3:
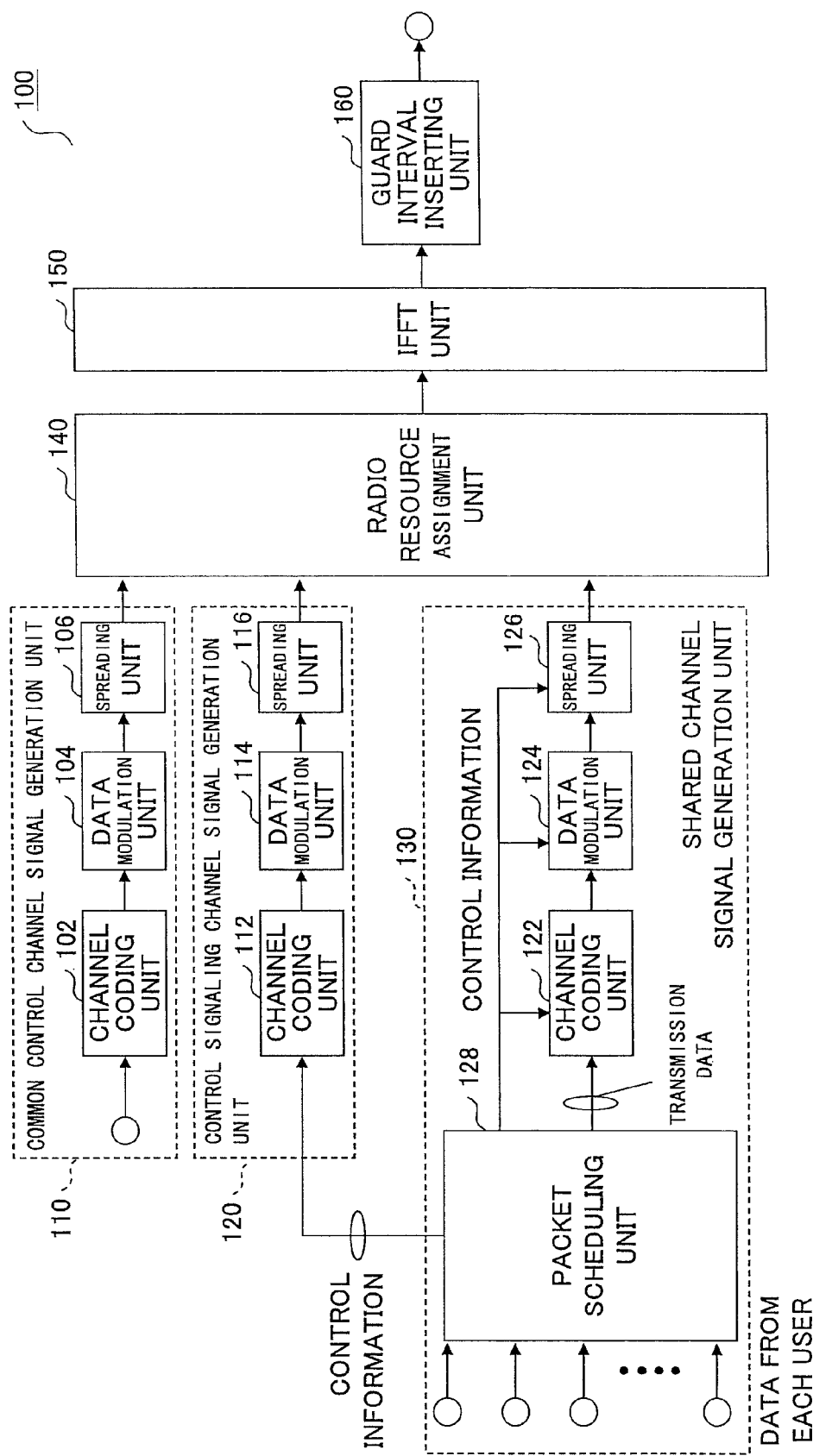
FIG. 3 is a block diagram showing a transmission apparatus of an embodiment of the present invention.

A transmission apparatus of an embodiment of the present invention is described with reference to FIG. 3.

The transmission apparatus is provided in a base station, for example, and transmits a downlink channel.

The transmission apparatus 100 transmits the common control channel and the control signaling channel using an entire frequency band or at least a part of frequency bands discretely located over the entire frequency band. Accordingly, diversity effect can be obtained in a frequency domain.

In addition, the transmission apparatus 100 divides a time domain and a frequency domain, and transmits the shared channel based on packet scheduling for assigning a part corresponding to good receiving status to a user. Accordingly, multi-user diversity effect can be obtained.

In addition, the transmission apparatus 100 may transmit the shared channel based on packet scheduling of the time domain using the entire channel band. Accordingly, frequency diversity effect can be obtained.

The transmission apparatus 100 includes a common control channel signal generation unit 110, a control signaling channel signal generation unit 120, a shared channel signal generation unit 130, a radio resource assignment unit 140 connected to the common control channel signal generation unit 110, the control signaling channel generation unit 120 and the shared channel signal generation unit 130, an IFFT unit 150 connected to the radio resource assignment unit 140, and a guard interval inserting unit 160 connected to the IFFT unit 150.

The common control channel signal generation unit 110 includes a channel coding unit 102 to which transmission data sent by the common control channel is supplied, a data modulation unit 104 connected to the channel coding unit 102, and a spreading unit 106 connected to the data modulation unit 104. The spreading unit 106 is connected to the radio resource assignment unit 140.

The shared channel signal generation unit 130 includes a packet scheduling unit 128 to which data from each user is supplied, a channel coding unit 122 connected to the packet scheduling unit 128, a data modulation unit 124 connected to the channel coding unit 122, and a spreading unit 124 connected to the data modulation unit 124. The spreading unit 126 is connected to the radio resource assignment unit 140.

The control signaling channel signal generation unit 120 includes a channel coding unit 112 connected to the packet scheduling unit 128 as a scheduling means, a data modulation unit 114 connected to the channel coding unit 112, a spreading unit 116 connected to the data modulation unit 114. The spreading unit 116 is connected to the radio resource assignment unit 140.

Data from each user is supplied to the packet scheduling unit 128. In the packet scheduling unit 128, packet scheduling is performed for selecting a user to be assigned to the shared channel based on feedback information indicating radio status sent from each user (receiving station). For example, the packet scheduling unit 128 divides the time domain and the frequency domain to assign a part where the radio status is good to a user.

In addition, the packet scheduling unit 128 determines a channel coding rate and a data modulation scheme for the selected user. In addition, the packet scheduling unit 128 determines a spreading factor for the selected user. For example, the packet scheduling unit 128 determines the data modulation scheme and the data coding rate based on information indicating data modulation schemes and coding rates for receiving quality levels shown in FIG. 4 so as to perform transmission most efficiently according to an algorithm set beforehand.

The information indicating the data modulation schemes and the coding rates for the receiving quality levels are defined such that, the better the receiving quality level is, the greater a modulation level of the data modulation scheme is and the larger the coding rate is. For example, as the data modulation scheme, QPSK, 16QAM, and QAM are defined as the receiving quality becomes better. As the coding rate, increasing values form ⅕ to ¾ are defined as the receiving quality level becomes better. The data modulation scheme and the coding rate defined here are changed according to an environment, cell and the like where the transmission apparatus is installed.

In addition, the packet scheduling unit 128 supplies, to the channel coding unit 112, the data modulation unit 124 and the spreading unit 126, information obtained by packet scheduling that is, for example, a user ID indicating a selected user and information, as control information, indicating at least one of a spreading factor to be used for transmission for the user, a channel coding rate and a data modulation scheme.

In addition, the packet scheduling unit 128 supplies transmission data of a user selected by the packet scheduling to the channel coding unit 122, and the information is supplied to the data modulation unit 124.

The channel coding unit 122 performs channel coding on the transmission data according to the channel coding rate selected by the packet scheduling unit and supplies the transmission data to the data modulation unit 124.

The data modulation unit 124 performs data modulation on the transmission data on which channel coding has been performed according to the data modulation scheme selected by the packet scheduling unit 128, and supplies the data to the spreading unit 126.

The spreading unit 126 spreads the transmission data on which data modulation has been performed with the spreading factor selected by the packet scheduling unit 128, and supplies the data to the radio resource assignment unit 140.

On the other hand, control information supplied to the channel coding unit 112 by the packet scheduling unit 128 is channel-coded according to a channel coding rate set beforehand in the channel coding unit 112, and the control information is supplied to the data modulation unit 114.

The data modulation unit 114 performs data modulation on the control information to which channel coding has been performed according to a data modulation scheme set beforehand, and supplies the control information to the spreading unit 116.

The spreading unit 116 spreads the control information on which data modulation has been performed according to the spreading factor set beforehand, and supplies the control information to the radio resource assignment unit 140.

In addition, information transmitted by the common control channel is supplied to the channel coding unit 102, so that channel coding is performed according to a channel coding rate set beforehand, and the information is supplied to the data modulation unit 104.

The data modulation unit 104 performs data modulation on transmission data on which channel coding has been performed, and supplies the transmission data to the spreading unit 106.

The spreading unit 116 spreads the transmission data on which data modulation has been performed according to a spreading factor set beforehand, and supplies the transmission data to the radio resource assignment unit 140.

The channel coding rate used by the channel coding units 102 and 112, the data modulation schemes used by the data modulation units 104 and 114, and the spreading factors used by the spreading units 106 and 116 are changeable according to an environment and a cell (sector).

The radio resource assignment unit 140 assigns radio resources to the common control channel, the control signaling channel and the shared channel.

Figure 5:
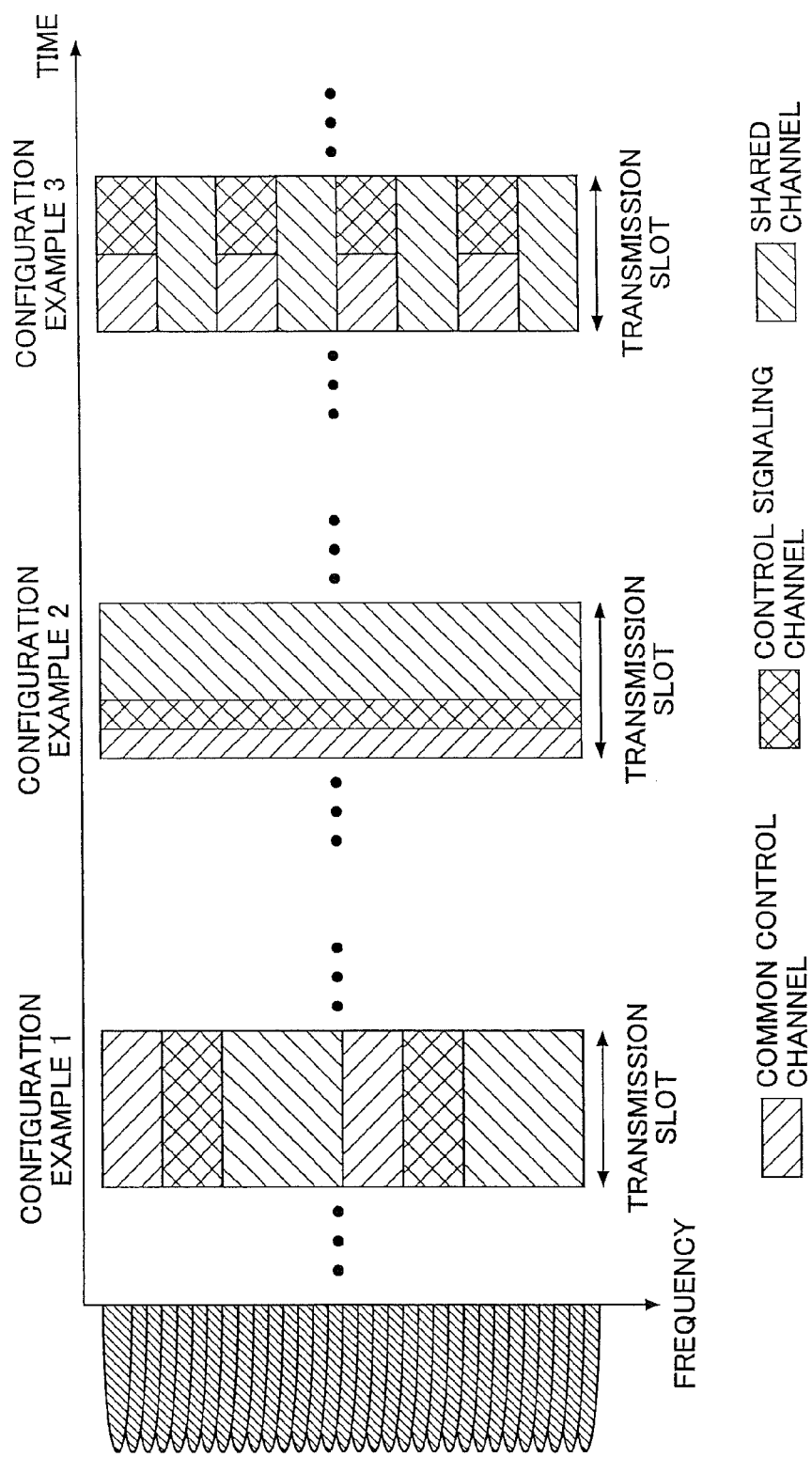
FIG. 5 is an explanatory diagram showing radio resource assignment to a common control channel, a control signaling channel and a shared channel.

Descriptions are provided with reference to FIG. 5.

For example, when assigning radio resources to the common control channel and the control signaling channel, as shown in configuration 1, the radio resource assignment unit 140 divides an entire frequency band assigned to the system into sub-carrier blocks each formed by one or more sub-carriers, and assigns at least a sub-carrier block to a transmission slot indicating a unit (TTI: Transmission Time Interval) of packet transmission.

In addition, when assigning radio resources to the shared channel, the radio resource assignment unit 140 assigns radio resources other than those assigned to the common control channel and the control signaling channel. Accordingly, as to the common control channel and the control signaling channel, mapping to discrete frequency domains over the entire frequency band is performed, so that receiving quality in the receiver can be improved due to frequency diversity effect.

In addition, as shown in configuration 2, when assigning radio resources to the common control channel and the control signaling channel, the radio resource assignment unit 140 may assign, to the common control channel and the control signaling channel, at least a part of a plurality of symbols forming the transmission slot that indicates the unit (TTI: Transmission Time Interval) of transmission in packet transmission.

Also in this case, when assigning radio resources to the shared channel, the radio resource assignment unit 140 assigns symbols other than the symbols to which the common control channel or the control signaling channel is assigned. Accordingly, since the common control channel and the control signaling channel can be mapped over the entire frequency band, receiving quality of the receiver can be improved due to frequency diversity effect.

In addition, as shown in configuration 3, when assigning radio resources to the common control channel and the control signaling channel, the radio resource assignment unit 140 divides the entire frequency band assigned to the system into sub-carrier blocks each formed by one or more sub-carriers in the frequency axis direction, and divides in units of a plurality of OFDM symbols in the time axis direction, so as to form frequency blocks using a plurality of sub-carriers and a plurality of OFDM symbols.

The radio resource assignment unit 140 may select at least one of a plurality of frequency blocks to assign it to the common control channel and the control signaling channel. In addition, the radio resource assignment unit 140 may assign at least a part of a plurality of OFDM symbols forming the frequency block to the common control channel and the control signaling channel.

Also in this case, when assigning the radio resources to the shared channel, the radio resource assignment unit 140 may assign at least one of symbols and frequency blocks other than symbols assigned to the common control channel and the control signaling channel. Accordingly, since the common control channel and the control signaling channel can be mapped to discrete frequency domains in the entire frequency band, receiving quality in the receiver can be improved due to the frequency diversity effect.

The IFFT unit 150 performs inverse fast Fourier transform on the input signal to perform modulation of the OFDM scheme.

The GI adding unit 160 adds a guard interval to a signal to be transmitted to generate a symbol of the OFDM scheme. The guard interval is obtained by copying a part of a head or an end of a symbol to be transmitted.

In the following, assignment of radio resources is described concretely for each of the common control channel, the control signaling channel and the shared channel.

First, radio resource assignment for the common control channel is described with reference to FIGS. 6A-6L.

The common control channel is information directed to all users in a cell. In addition, it is necessary that the users in the cell can receive the information with required spatial probability and with required quality, for example, with a predetermined error rate. Thus, when transmission is performed using only a narrow frequency band in the entire frequency band, receiving status in the frequency is different for each user and there is a risk that there occurs a user for whom receiving status is bad depending on circumstances. In addition, since the information is directed to all users, usage of performing assignment with packet scheduling to perform signal transmission is not possible.

Therefore, in the common control channel, packet scheduling is not applied, and the channel is assigned to the entire frequency band or at least a part of frequency bands discretely placed over the entire frequency band. Accordingly, frequency diversity effect can be obtained.

Figure 6A:
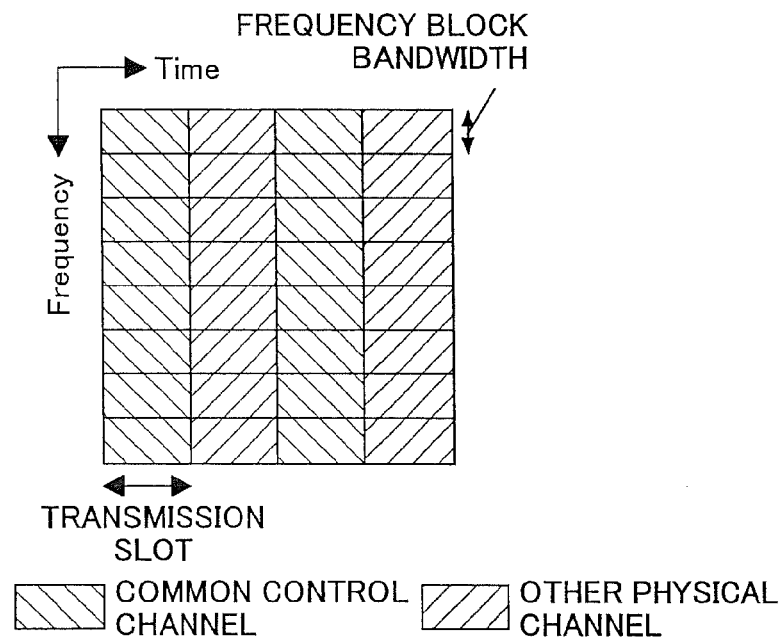
FIG. 6A is an explanatory diagram showing radio resource assignment to the common control channel.

For example, when assigning radio resources to the common control channel, as shown in FIG. 6A, the common control channel is assigned to at least one transmission slot, and transmission is performed using the entire frequency band in the assigned transmission slot. By using the entire frequency band in this way, receiving quality in the receiver can be improved due to frequency diversity effect.

Figure 6B:
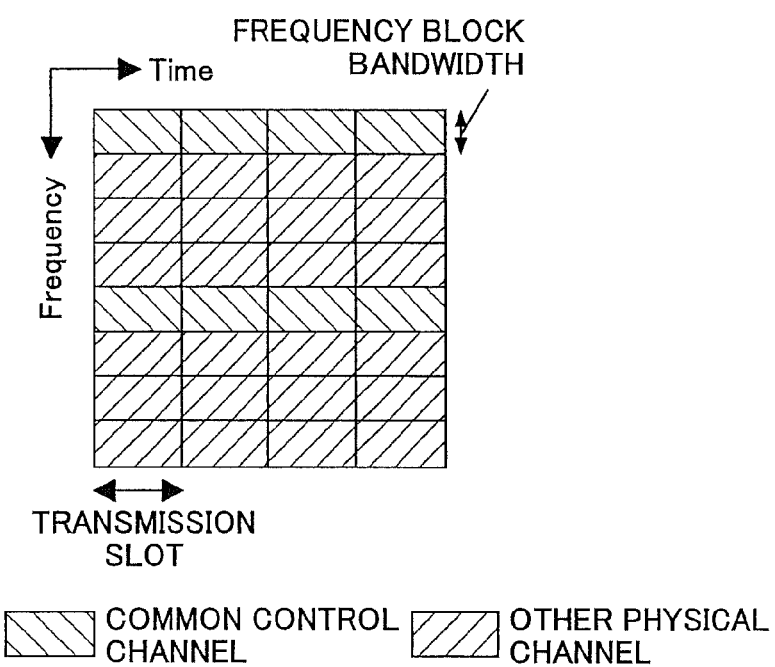
FIG. 6B is an explanatory diagram showing radio resource assignment to the common control channel.

In addition, when assigning radio resources to the common control channel, as shown in FIG. 6B, the entire frequency band assigned to the system is divided into sub-carrier blocks each formed by a plurality of sub-carriers, and the common control channel is sequentially mapped to at least one of the sub-carrier blocks. By performing mapping in the frequency direction in this way, receiving quality in the receiver can be improved due to frequency diversity effect.

Figure 6C:
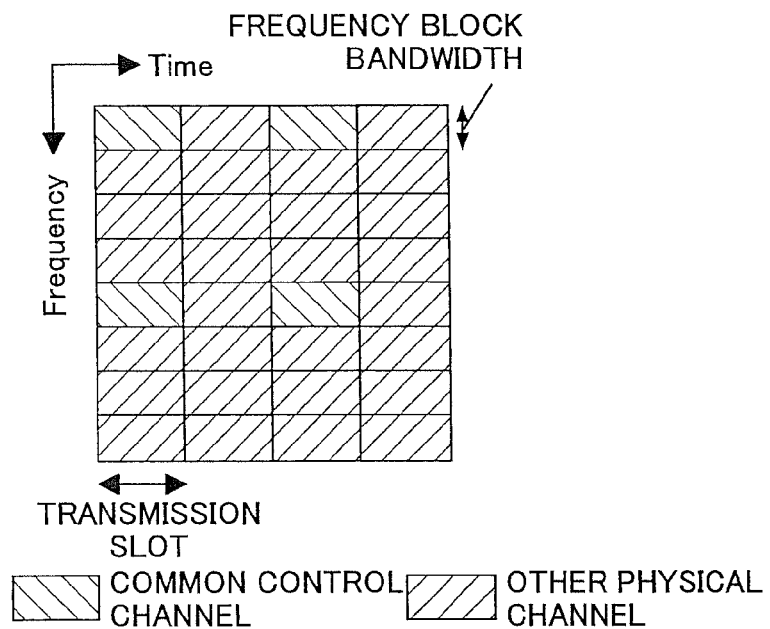
FIG. 6C is an explanatory diagram showing radio resource assignment to the common control channel.

In addition, when assigning radio resources to the common control channel, as shown in FIG. 6C, the configurations 1 and 2 are combined so that the common control channel is mapped to at least one sub-carrier block in at least one transmission slot. By performing mapping in the frequency direction in this way, receiving quality in the receiver can be improved due to frequency diversity effect.

Figure 6D:
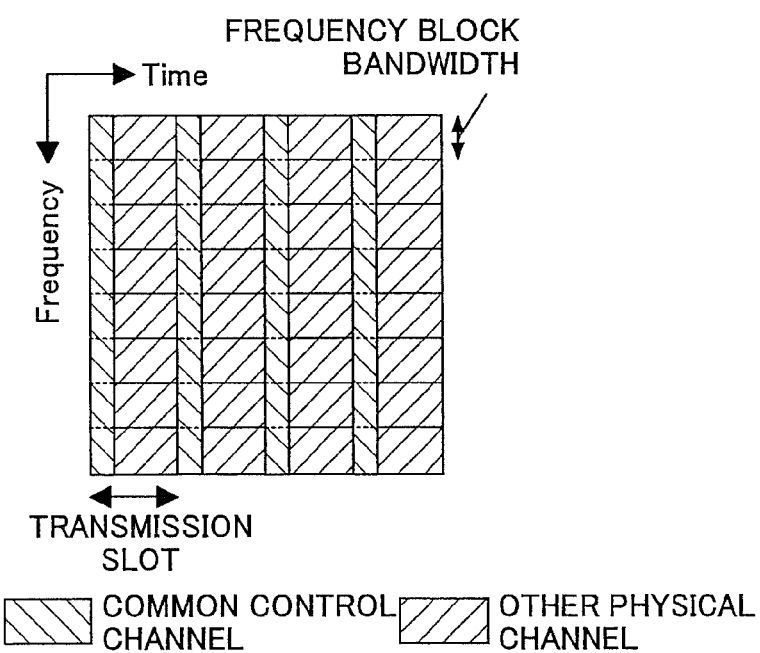
FIG. 6D is an explanatory diagram showing radio resource assignment to the common control channel.

In addition, when assigning radio resources to the common control channel, as shown in FIG. 6D, the common control channel is assigned to a part of symbols in at least one transmission slot, and transmission is performed using the entire frequency band in the symbol to which assignment is performed. Accordingly, by using the entire frequency band, receiving quality in the receiver can be improved due to frequency diversity effect.

Figure 6E:
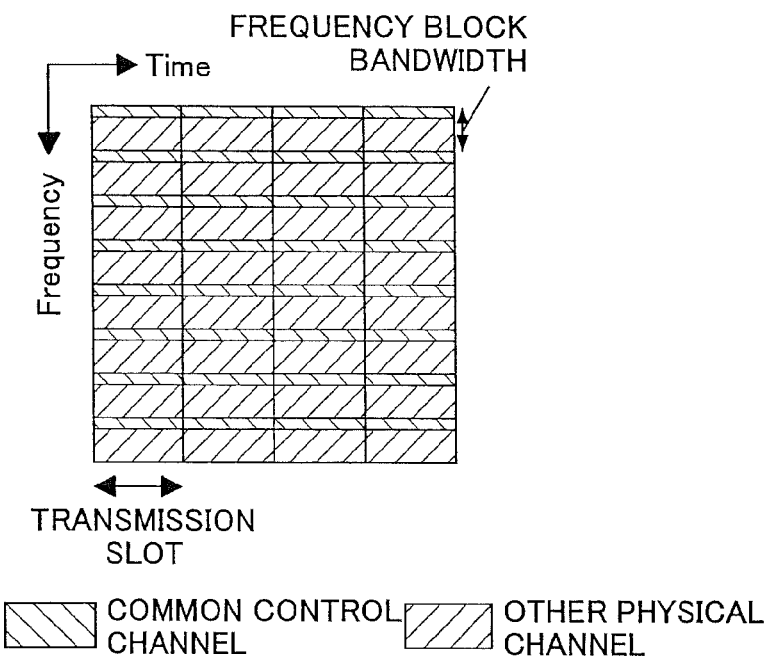
FIG. 6E is an explanatory diagram showing radio resource assignment to the common control channel.

In addition, when assigning radio resources to the common control channel, as shown in FIG. 6E, the entire frequency band assigned to the system is divided into sub-carrier blocks each formed by a plurality of sub-carriers, and the common control channel is sequentially mapped to a part of sub-carriers in at least one sub-carrier block. By performing mapping in the frequency direction in this way, receiving quality in the receiver can be improved due to frequency diversity effect.

Figure 6F:
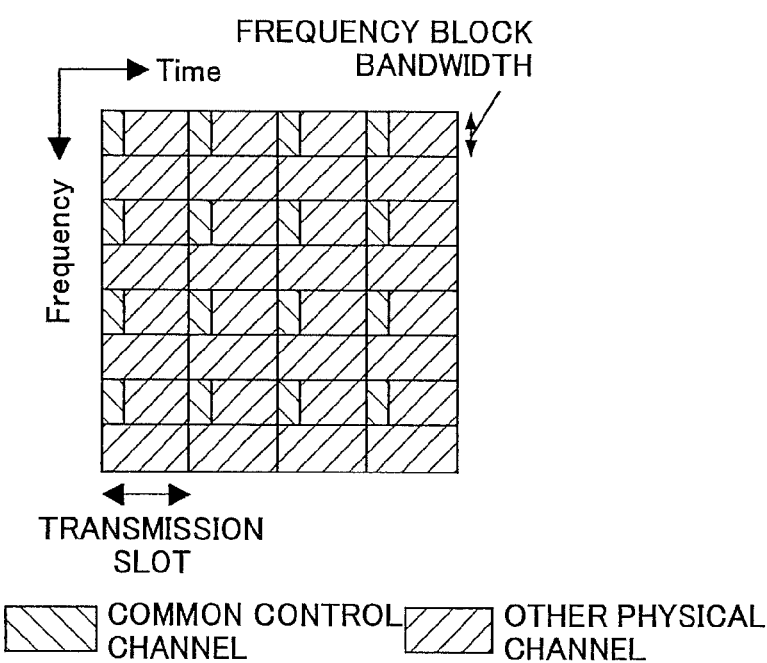
FIG. 6F is an explanatory diagram showing radio resource assignment to the common control channel.

In addition, when assigning radio resources to the common control channel, as shown in FIG. 6F, the configurations 3 and 4 are combined to map the common control channel into a part of sub-carriers in at least one sub-carrier block in a part of symbols in at least one transmission slot. By performing mapping in the frequency direction in this way, receiving quality in the receiver can be improved due to frequency diversity effect.

Figure 6G:
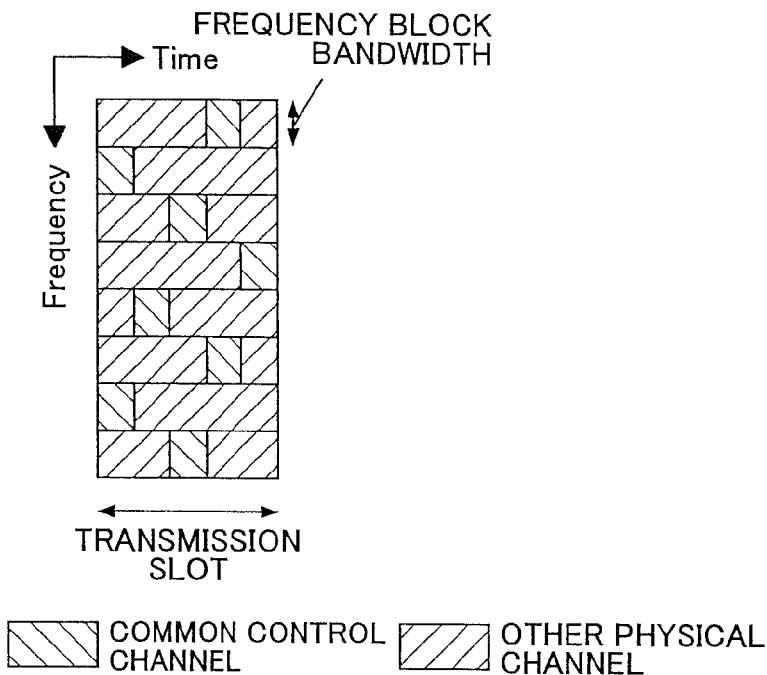
FIG. 6G is an explanatory diagram showing radio resource assignment to the common control channel.

In addition, when assigning radio resources to the common control channel, as shown in FIG. 6G, the common control channel is mapped to a part of symbols in at least one sub-carrier block in at least one transmission slot. In this case, in each transmission slot, the common control channel to be mapped is placed such that the position is different in at least a part of sub-carrier blocks. By mapping the common control channel in the frequency direction and the time axis direction in this way, receiving quality in the receiver can be improved due to time diversity effect in addition to the frequency diversity effect. For example, when the receiver is moving at high speed, there is a case where receiving quality in a frequency falls down at a certain instant. In such a case, by performing mapping such that the position of the common control channel to be mapped to each sub-carrier block is different in at least a part of sub-carrier blocks, the time diversity effect can be obtained so that receiving quality can be improved.

Figure 6H:
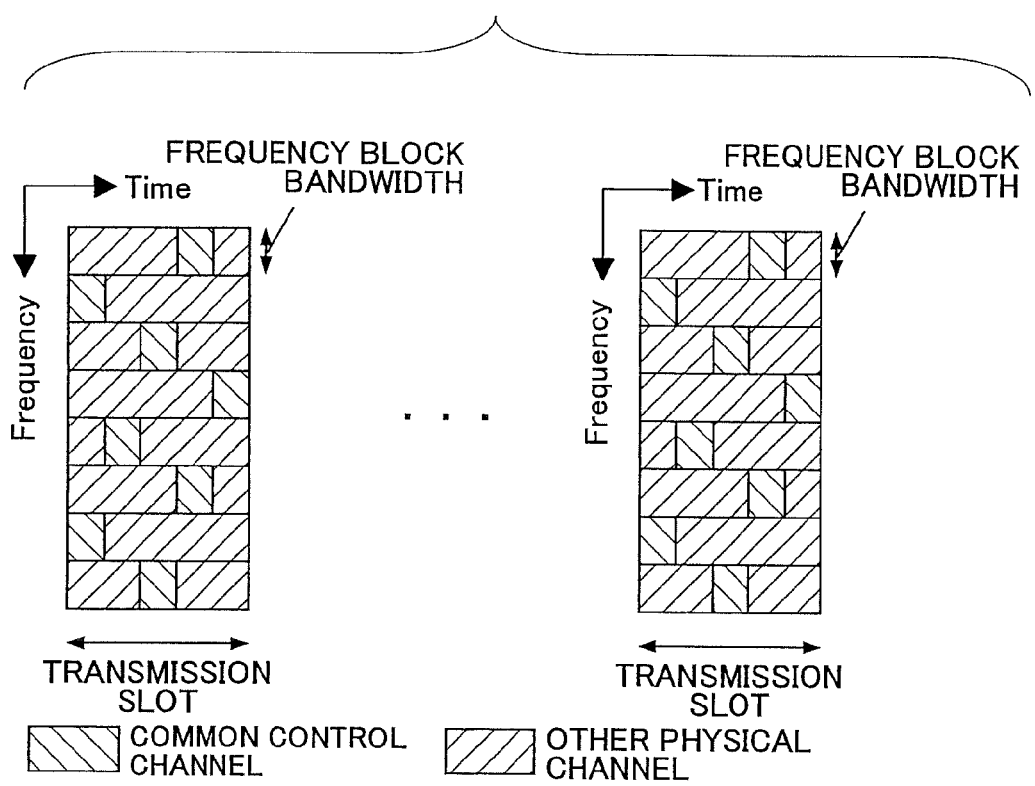
FIG. 6H is an explanatory diagram showing radio resource assignment to the common control channel.

In addition, as shown in FIG. 6H, when assigning the radio resources to the common control channel, the transmission slot described in FIG. 6G may be transmitted a predetermined number of times at intervals of a predetermined time. Accordingly, by transmitting a same transmission slot a plurality of number of times, receiving quality in the receiver can be improved due to the time diversity effect in addition to the frequency diversity effect. In this case, the time interval by which the transmission slot is sent is adaptively controlled according to the environment. For example, the transmission interval is set to be long in an environment like an office where movement is small, and the transmission interval is set to be short in an environment like a city where movement is large. In addition, mapping may be performed such that a position of the common control channel to be mapped to a part of symbols of at least one sub-carrier block in a transmission slot to be transmitted secondly or later is different from a position of previously transmitted common control channel.

Figure 6I:
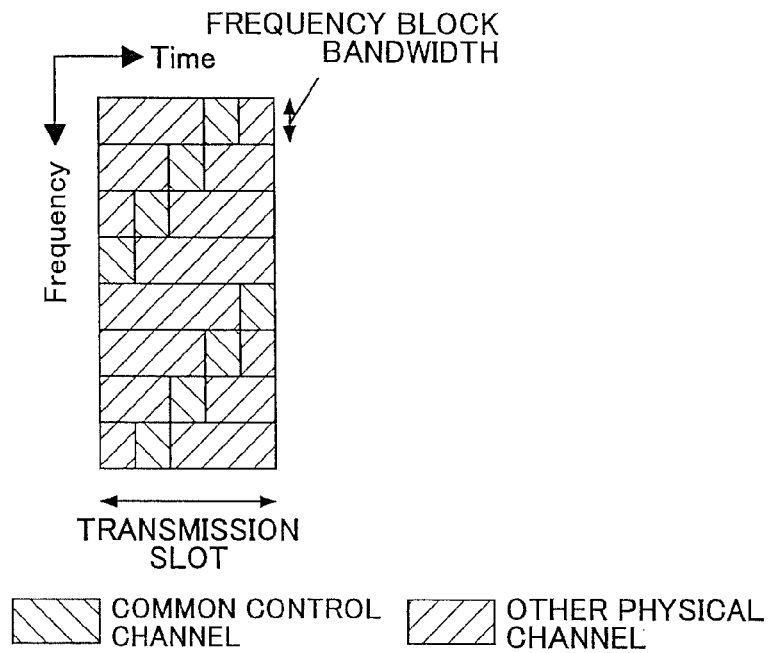
FIG. 6I is an explanatory diagram showing radio resource assignment to the common control channel.
Figure 6J:
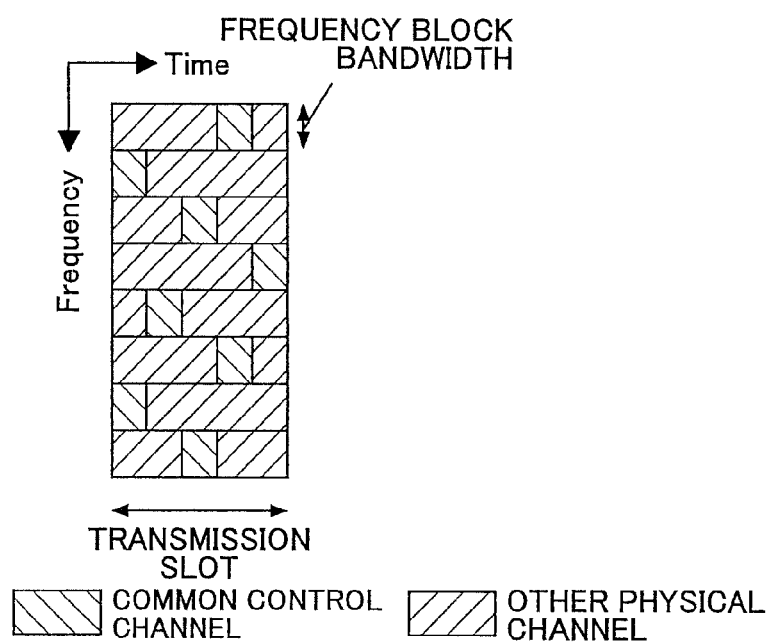
FIG. 6J is an explanatory diagram showing radio resource assignment to the common control channel.

The position of the common control channel in each sub-carrier block described in FIGS. 6G and 6H is determined fixedly beforehand based on a predetermined rule as shown in FIG. 6I. In addition, the position of the common control channel in each sub-carrier block may be randomly determined in each sub-carrier block as shown in FIG. 6J.

In addition, in FIG. 6H, as shown in FIG. 6K, information same as one transmitted first is transmitted by the common control channel transmitted secondly or later. In this case, demodulation processing is performed in the receiver, and it is determined whether there is a demodulation error. When there is no demodulation error, the receiver is controlled such that it does not receive the common control channel transmitted secondly or later. When there is a demodulation error, the information is discarded, and the common control channel transmitted secondly or later is demodulated again (no packet combining, Type-I).

In addition, as shown in FIG. 6L, when there is a demodulation error, the information may not be discarded so as to perform packet combining for the common control channel transmitted secondly or later and the common control channel received previously to demodulate again (packet combining exists, Type-I). Accordingly, receiving SIR can be improved.

In addition, in FIG. 6H, the common control channel transmitted secondly or later may be for transmitting information different from one in the first transition. For example, the common control channel transmitted secondly or later may be configured to transmit a packet on which puncturing is performed with a pattern different from a pattern for the first transmission (packet combining exists, Type-II). In this case, demodulation processing is performed in the receiver side, and it is determined whether there is a demodulation error. When there is no demodulation error, the receiver is controlled such that it does not receive the common control channel transmitted thirdly or later. When there is a demodulation error, the information may not be discarded, and packet combining may be performed for the common control channel transmitted secondly or later and the common control channel received previously to demodulate again. Accordingly, coding gain can be improved.

In addition, in FIG. 6H, the common control channel transmitted secondly or later may be configured to transmit information different from one sent first. For example, information indicating the common control channel is divided into two or more, and the divided information is transmitted. When information is stored in the common control channel transmitted first and redundancy code is stored in the common control channel transmitted secondly or later, the common control channel transmitted secondly or later cannot be decoded when receiving of the common control channel transmitted first is failed.

In such a case, by dividing information indicating the common control channel into two or more, receiving quality in the receiver can be improved due to time diversity effect. In this case, a transmission slot for transmitting information indicating the common control channel by dividing it and a packet storing the redundancy code may be transmitted.

In this case, it is necessary to determine a number of division of the common control channel beforehand in the transmitter and the receiver. As information to be determined beforehand, a packet number for performing packet combining, a puncture pattern, constellation, and a bit indicating new or retransmitted packet are necessary. The bit indicating a new or retransmitted packet is necessary for avoiding incorrect combining considering ACK/NACK bit error.

Next, assignment of radio resources to the control signaling channel is described with reference to FIGS. 7A-7L.

The control signaling channel is a signal transmitted for each user scheduled by the packet scheduling unit 128, and it is necessary for specific many users who desire scheduling in the cell to be able to receive the signal with a required spatial probability and a required quality, that is, with a predetermined error rate, for example. Therefore, the channel is assigned to the entire frequency band or at least a part of the entire frequency band that is discretely located over the entire frequency band without applying packet scheduling. Accordingly, frequency diversity effect can be obtained.

Figure 7A:
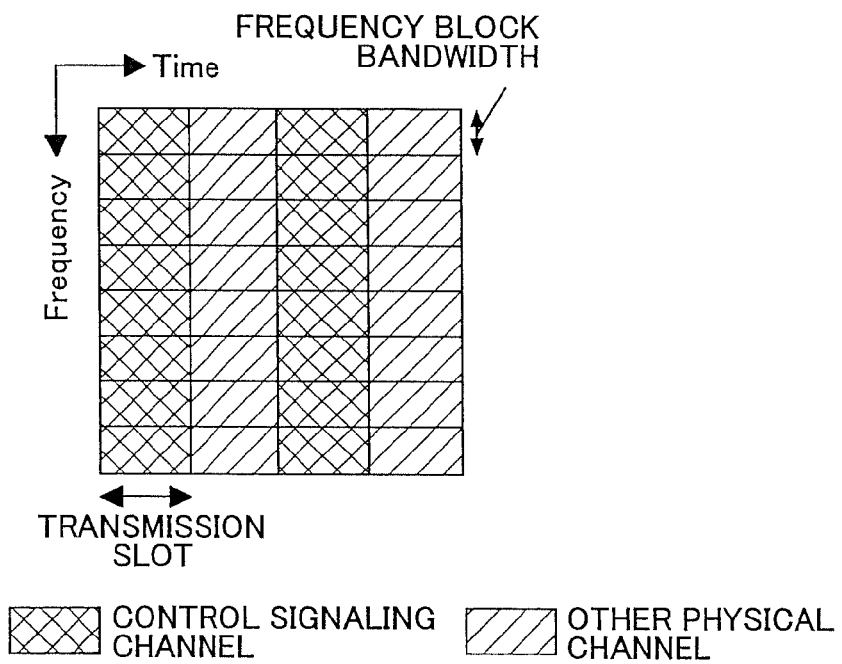
FIG. 7A is an explanatory diagram showing radio resource assignment to the control signaling channel.

For example, as shown in FIG. 7A, when assigning radio resources to the control signaling channel, the control signaling channel is assigned to at least one transmission slot, and transmission is performed using all of the entire frequency band in the assigned transmission slot. By using the entire frequency band in this way, receiving quality in the receiver can be improved due to frequency diversity effect.

Figure 7B:
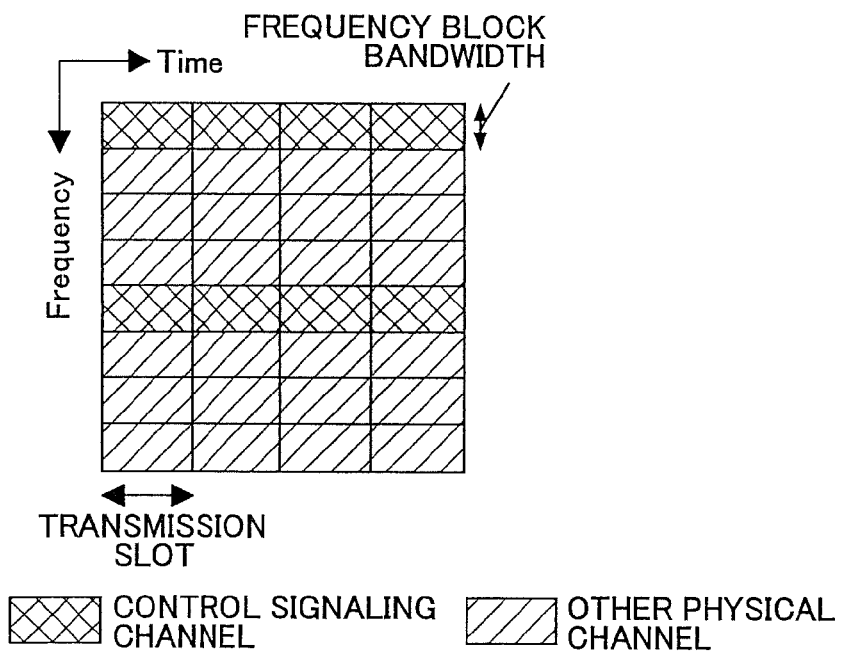
FIG. 7B is an explanatory diagram showing radio resource assignment to the control signaling channel.

In addition, as shown in FIG. 7B, when assigning the radio resources to the control signaling channel, the entire frequency band assigned to the system is divided into sub-carrier blocks each formed by a plurality of sub-carriers so that the control signaling channel is mapped sequentially to at least one sub-carrier block. By performing mapping in the frequency direction in this way, receiving quality in the receiver can be improved due to the frequency diversity effect.

Figure 7C:
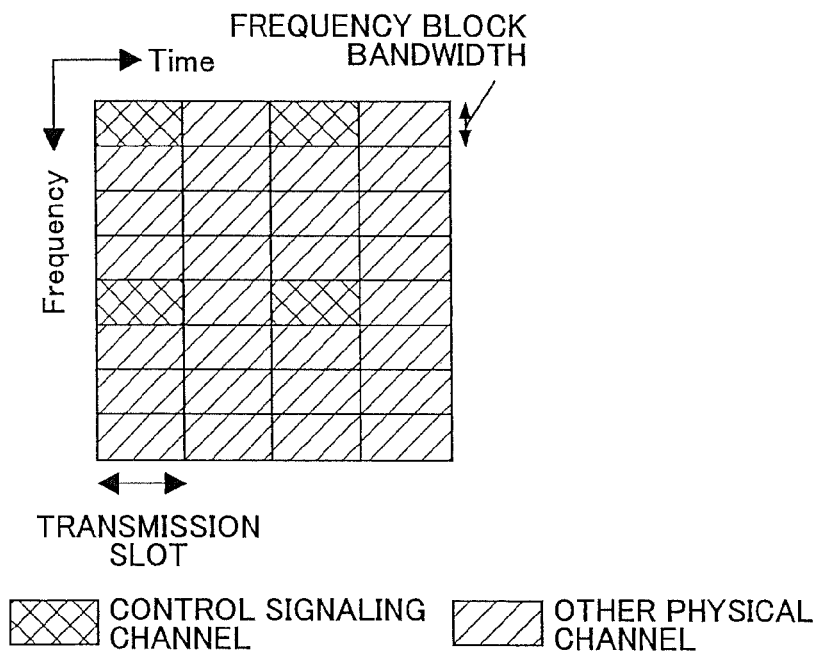
FIG. 7C is an explanatory diagram showing radio resource assignment to the control signaling channel.

In addition, as shown in FIG. 7C, when assigning the radio resources to the control signaling channel, FIG. 7A and FIG. 7B are combined so that the control signaling channel is mapped to at least one sub-carrier block in at least one transmission slot. By performing mapping in the frequency direction in this way, receiving quality in the receiver can be improved due to frequency diversity effect.

Figure 7D:
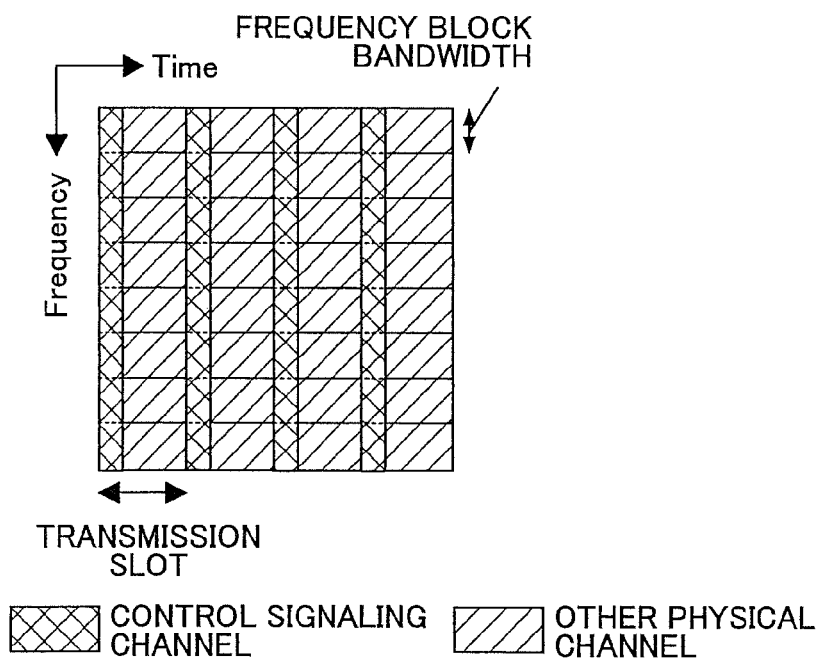
FIG. 7D is an explanatory diagram showing radio resource assignment to the control signaling channel.

In addition, when assigning radio resources to the control signaling channel, as shown in FIG. 7D, the control signaling channel is assigned to a part of symbols in at least one transmission slot, and transmission is performed using the entire frequency band in the symbol to which assignment is performed. By using the entire frequency band in this way, receiving quality in the receiver can be improved due to frequency diversity effect.

Figure 7E:
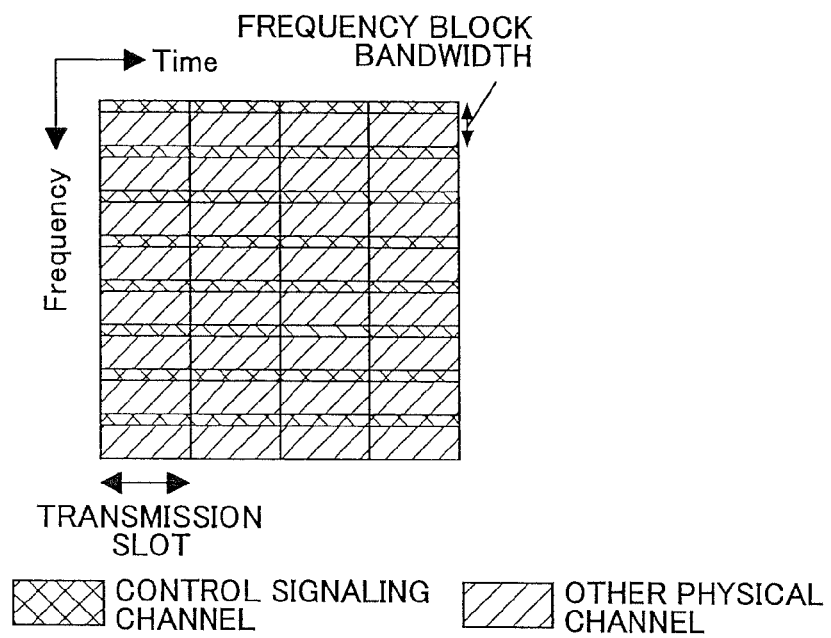
FIG. 7E is an explanatory diagram showing radio resource assignment to the control signaling channel.

In addition, when assigning radio resources to the control signaling channel, as shown in FIG. 7E, the entire frequency band assigned to the system is divided into sub-carrier blocks each formed by a plurality of sub-carriers, and the control signaling channel is sequentially mapped to a part of sub-carriers in at least one sub-carrier block. By performing mapping in the frequency direction in this way, receiving quality in the receiver can be improved due to frequency diversity effect.

Figure 7F:
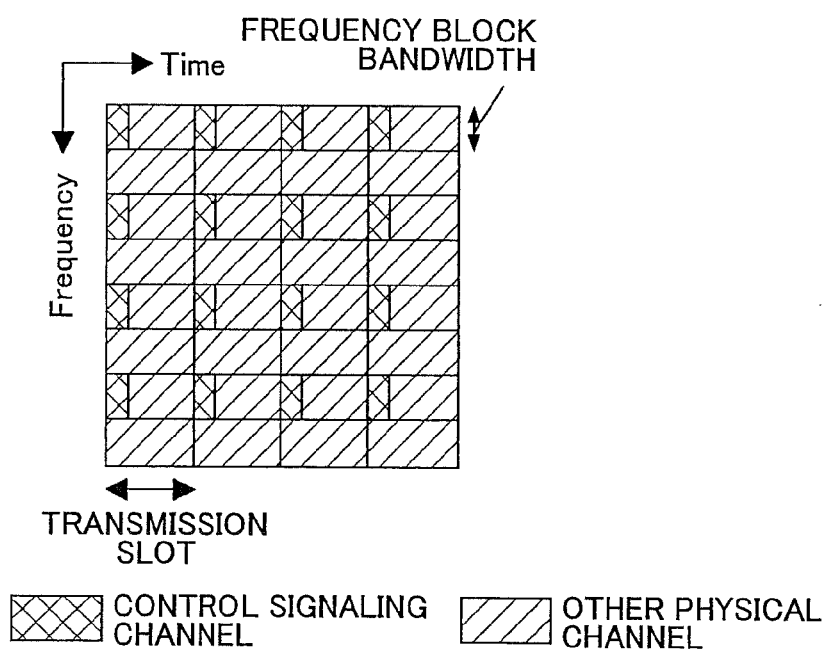
FIG. 7F is an explanatory diagram showing radio resource assignment to the control signaling channel.

In addition, when assigning radio resources to the control signaling channel, as shown in FIG. 7F, FIG. 7C and FIG. 7D are combined to map the control signaling channel into a part of sub-carriers in at least one sub-carrier block in a part of symbols in at least one transmission slot. By performing mapping in the frequency direction in this way, receiving quality in the receiver can be improved due to frequency diversity effect.

Figure 7G:
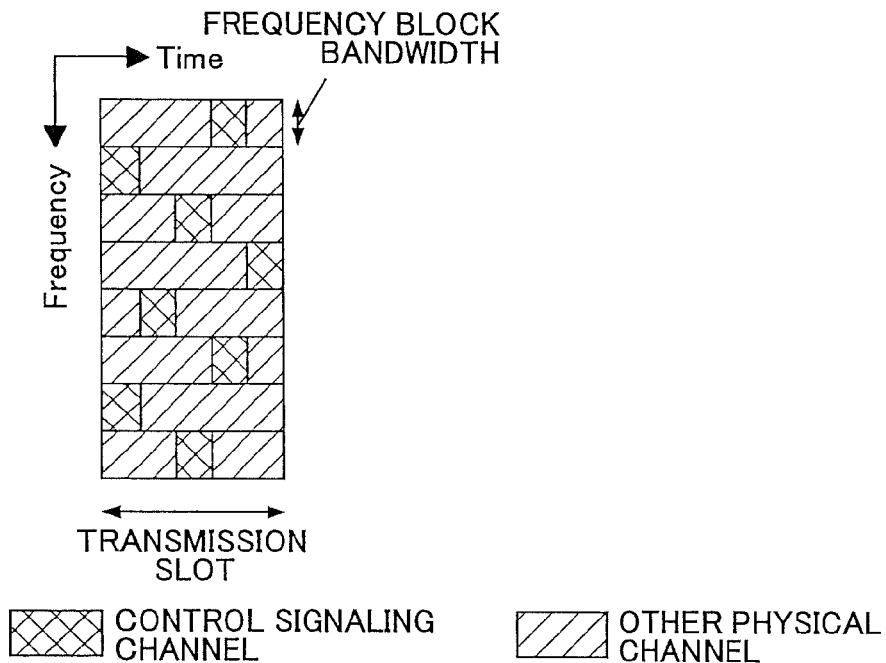
FIG. 7G is an explanatory diagram showing radio resource assignment to the control signaling channel.

In addition, when assigning radio resources to the control signaling channel, as shown in FIG. 7G, the control signaling channel is mapped to a part of symbols in at least one sub-carrier block in at least one transmission slot. In this case, in each transmission slot, the control signaling channel to be mapped is placed such that the position is different in at least a part of sub-carrier blocks. By mapping the control signaling channel in the frequency direction and the time axis direction in this way, receiving quality in the receiver can be improved due to time diversity effect in addition to the frequency diversity effect. For example, when the receiver is moving at high speed, there is a case where receiving quality in a frequency falls down at a certain instant. In such a case, by performing mapping such that the position of the control signaling channel to be mapped to each sub-carrier block is different in at least a part of sub-carrier blocks, the time diversity effect can be obtained so that receiving quality can be improved.

Figure 7H:
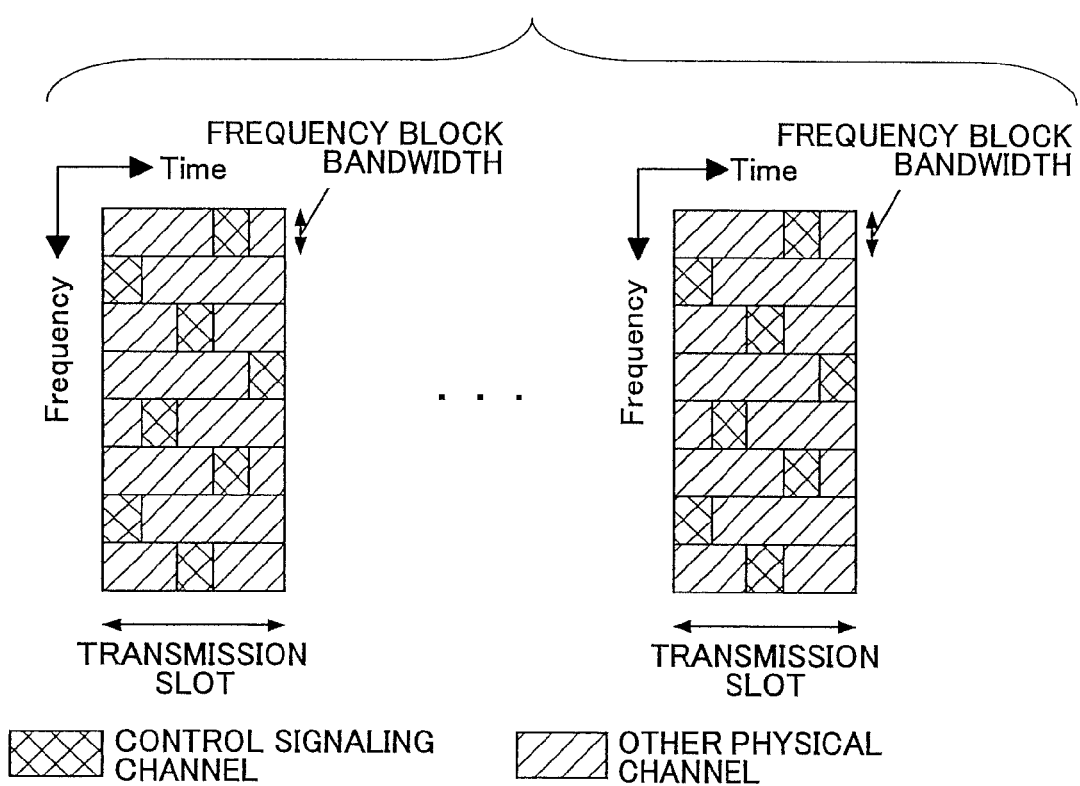
FIG. 7H is an explanatory diagram showing radio resource assignment to the control signaling channel.

In addition, as shown in FIG. 7H, when assigning the radio resources to the control signaling channel, the transmission slot described in FIG. 7G may be transmitted a predetermined number of times at intervals of a predetermined time. By transmitting a same transmission slot a plurality of number of times in this way, receiving quality in the receiver can be improved due to the time diversity effect in addition to the frequency diversity effect. In this case, the time interval by which the transmission slot is sent is adaptively controlled according to the environment. For example, the transmission interval is set to be long in an environment like an office where movement is small, and the transmission interval is set to be short in an environment like a city where movement is large. In addition, mapping may be performed such that a position of the control signaling channel to be mapped to a part of symbols of at least one sub-carrier block in a transmission slot to be transmitted secondly or later is different from a position of previously transmitted control signaling channel.

Figure 7I:
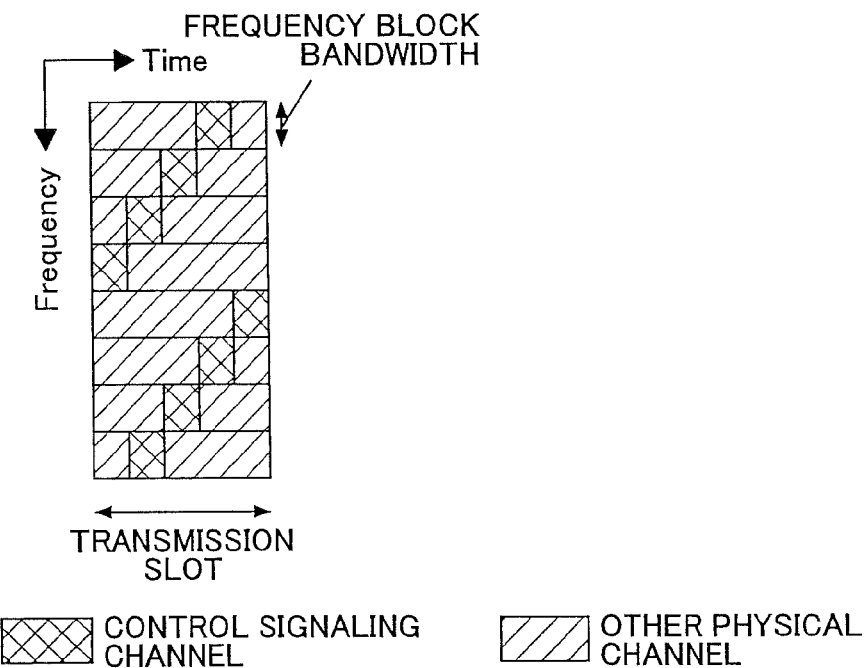
FIG. 7I is an explanatory diagram showing radio resource assignment to the control signaling channel.
Figure 7J:
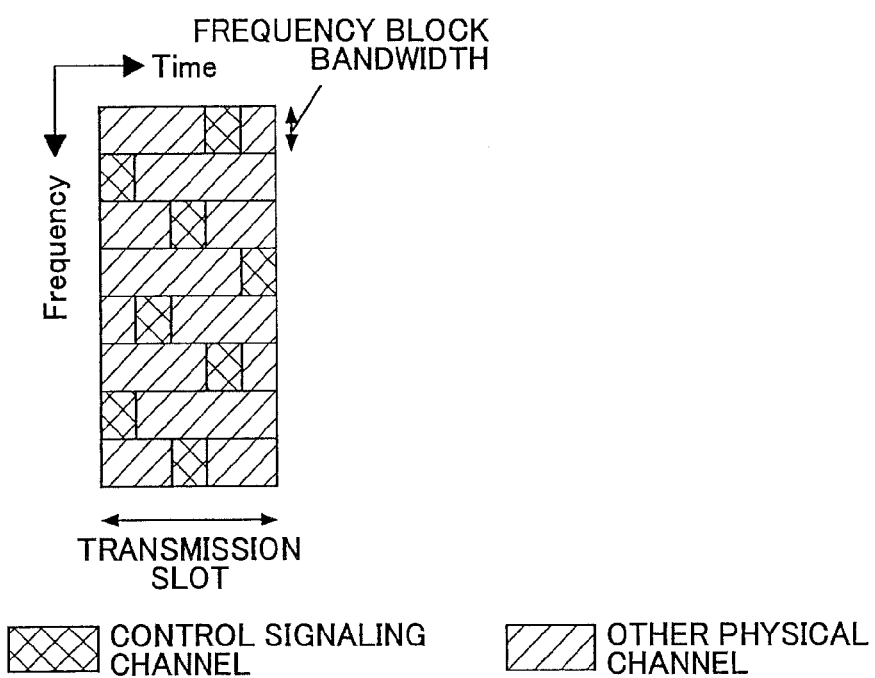
FIG. 7J is an explanatory diagram showing radio resource assignment to the control signaling channel.

The position of the control signaling channel in each sub-carrier block described in FIGS. 7G and 7H is determined fixedly beforehand based on a predetermined rule as shown in FIG. 7I. In addition, the position of the control signaling channel in each sub-carrier block may be randomly determined in each sub-carrier as shown in FIG. 7J.

In addition, in FIG. 7H, as shown in FIG. 7K, information same as one transmitted first is transmitted by the control signaling channel transmitted secondly or later. In this case, demodulation processing is performed in the receiver, and it is determined whether there is a demodulation error. When there is no demodulation error, the receiver is controlled such that it does not receive the control signaling channel transmitted secondly or later. When there is a demodulation error, the information is discarded, and the control signaling channel transmitted secondly or later is demodulated again (no packet combining, Type-I).

In addition, as shown in FIG. 7L, when there is a demodulation error, the information may not be discarded so as to perform packet combining for the control signaling channel transmitted secondly or later and the control signaling channel received previously to demodulate again (packet combining exists, Type-I). Accordingly, receiving SIR can be improved.

In addition, in FIG. 7H, the control signaling channel transmitted secondly or later may be for transmitting information different from one in the first transition. For example, the control signaling channel transmitted secondly or later may be configured to transmit a packet on which puncturing is performed with a pattern different from a pattern for the first transmission (packet combining exists, Type-II). In this case, demodulation processing is performed in the receiver side, and it is determined whether there is a demodulation error. When there is no demodulation error, the receiver is controlled such that it does not receive the control signaling channel transmitted thirdly or later. When there is a demodulation error, the information may not be discarded, and packet combining may be performed for the control signaling channel transmitted secondly or later and the control signaling channel received previously to demodulate again. Accordingly, coding gain can be improved.

In addition, in FIG. 7H, the control signaling channel transmitted secondly or later may be configured to transmit information different from one sent first. For example, information indicating the control signaling channel is divided into two or more, and the divided information is transmitted. When information is stored in the control signaling channel transmitted first and redundancy code is stored in the control signaling channel transmitted secondly or later, the control signaling channel transmitted secondly or later cannot be decoded when receiving of the control signaling channel transmitted first is failed.

In such a case, by dividing information indicating the control signaling channel into two or more, receiving quality in the receiver can be improved due to time diversity effect. In this case, a transmission slot for transmitting information indicating the control signaling channel by dividing it and a packet storing the redundancy code may be transmitted.

In this case, it is necessary to determine a number of division of the control signaling channel beforehand in the transmitter and the receiver. As information to be determined beforehand, a packet number for performing packet combining, a puncture pattern, constellation, and a bit indicating new or retransmitted packet are necessary. The bit indicating a new or retransmitted packet is necessary for avoiding incorrect combining considering ACK/NACK bit error.

As mentioned above, cases where radio resources are assigned to the common control channel and the control signaling channel are described so far.

Next, a method for assigning radio resources to a plurality of common control channels and control signaling channels is described.

In this embodiment, descriptions are provided for each of a case where time multiplexing is applied, a case where frequency multiplexing is additionally used and a case where code multiplexing is additionally used.

First, a case where time multiplexing is applied is described.

Figure 8:
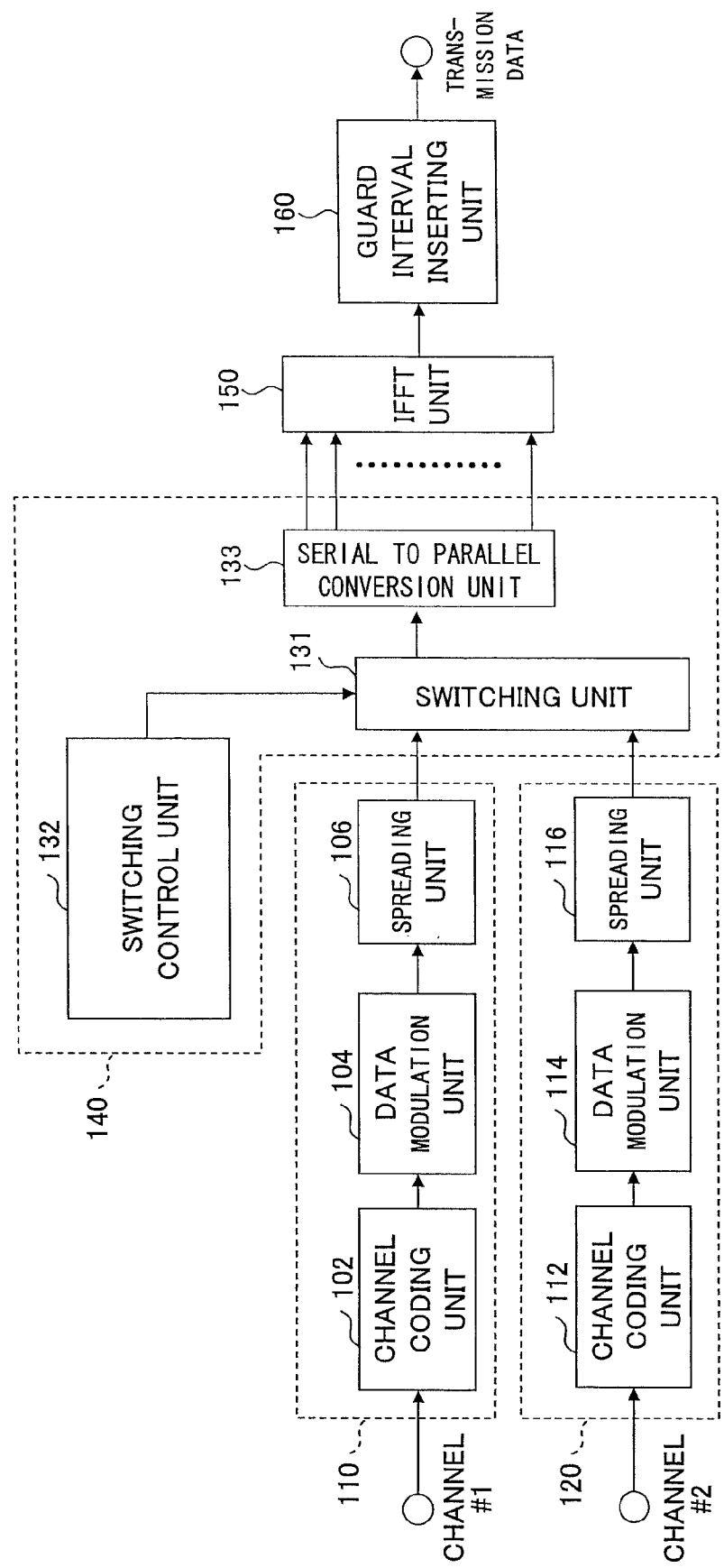
FIG. 8 is a block diagram showing a transmission apparatus of an embodiment of the present invention.

In this case, as shown in FIG. 8, the transmission apparatus is configured by a common control channel signal generation unit 110 to which transmission data to be transmitted by the common control channel as a channel #1 is supplied, a control signaling channel signal generation unit 120 to which control information is supplied from the packet scheduling unit 128 as a channel #2, a radio resource assignment unit 140, an IFFT unit 150 and a guard interval insertion unit 160.

The radio resource assignment unit 140 includes a switching unit 131 connected to spreading units 106 and 116, a switching control unit 132 and a serial to parallel conversion unit 133 connected to the switching unit 131. The serial to parallel conversion unit 133 is connected to the IFFT unit 150.

The switching control unit 132 performs control so as to switch channels to be transmitted for each symbol or each transmission slot. The switching unit 131 timely switches channels to be transmitted according to a control signal from the switching control unit 132 to supply signals to the serial to parallel conversion unit 133.

Figure 9A:
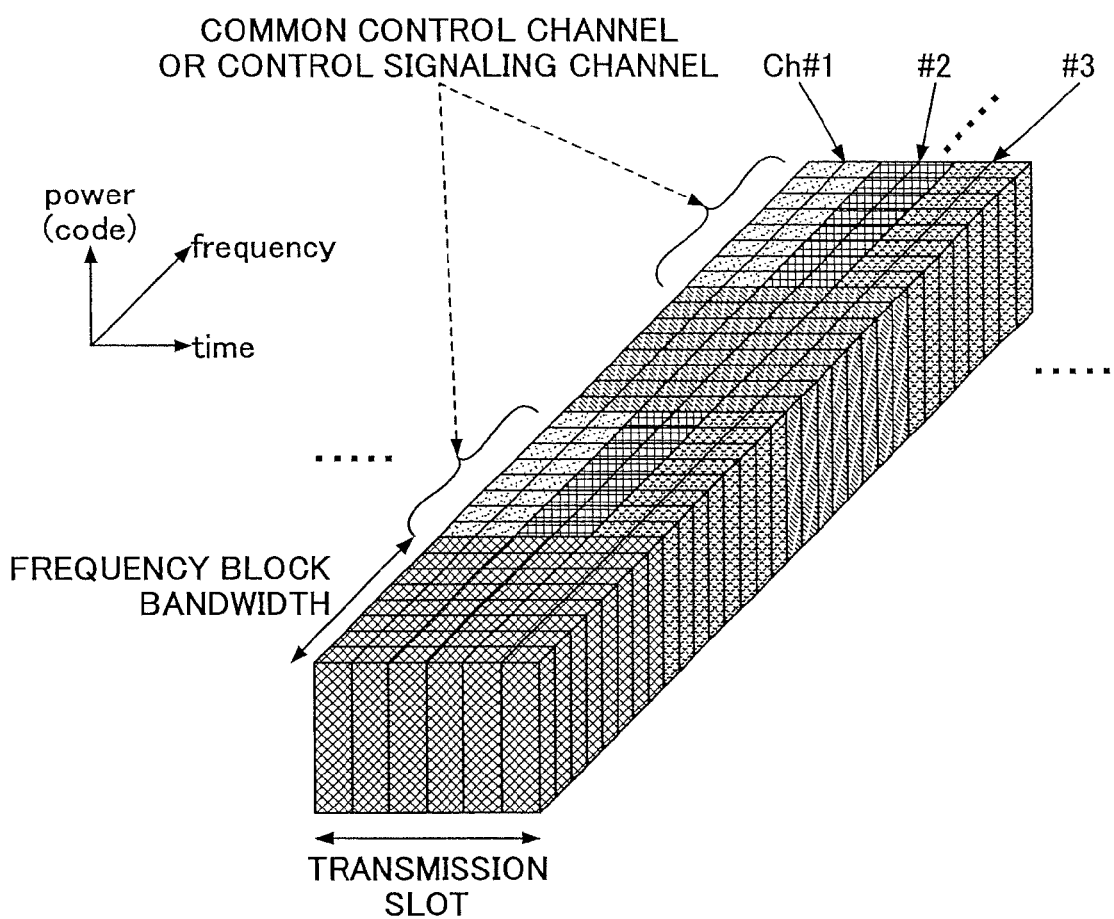
FIG. 9A is an explanatory diagram showing an application example of time multiplexing.

For example, as shown in FIG. 9A, the switching control unit 132 divides the time domain into a plurality of domains in an assigned frequency block, and performs switching so as to assign physical channels of a plurality of common control channels and control signaling channels in the divided time domains. For example, the switching control unit 132 performs switching so as to assign a plurality of physical channels of the common control channels and the control signaling channels in units of symbols included in the divided time domains, for example, for each of channels #1, #2, #3, . . . .

In this case, radio resources to which any of the common control channel and the control signaling channel is not assigned are assigned another physical channel such as an after-mentioned shared channel, for example.

Accordingly, by using at least one frequency block and by assigning a plurality of common control channels and the control signaling channels at a symbol level, receiving quality can be improved due to frequency diversity effect.

Figure 9B:
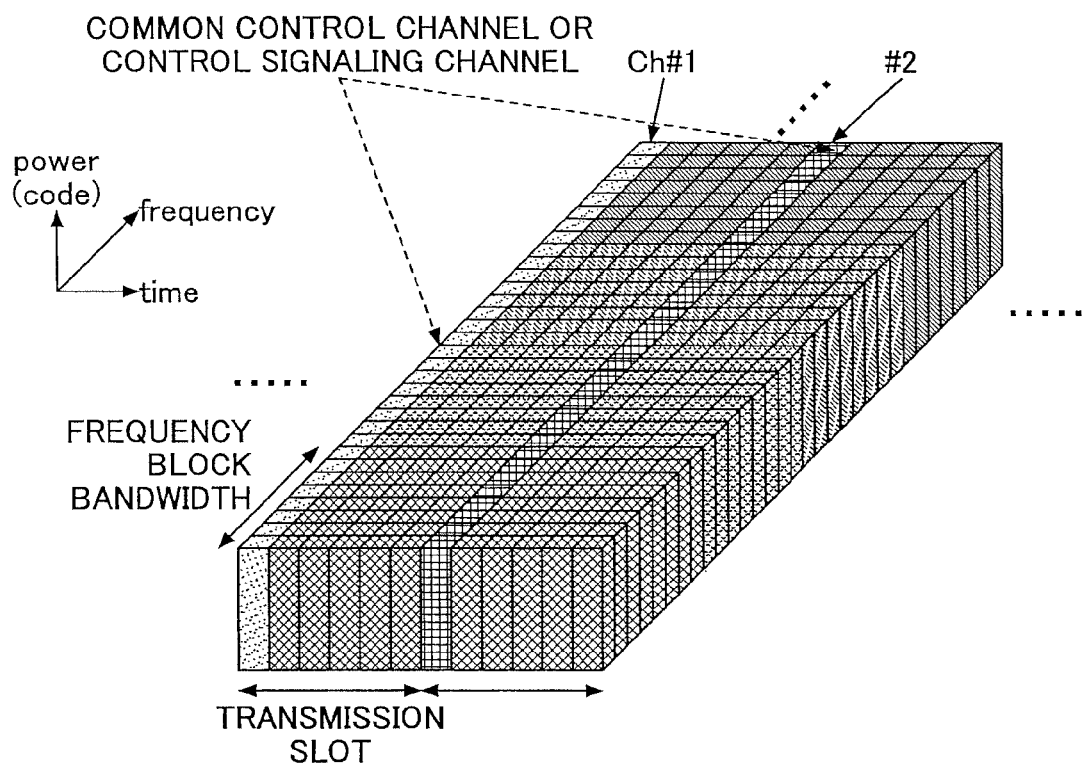
FIG. 9B is an explanatory diagram showing an application example of time multiplexing.

In addition, for example, as shown in FIG. 9B, the switching control unit 134 may perform switching, for each transmission slot, so as to assign a plurality of physical channels, as channels #1, #2, for example, including the common control channels, the control signaling channels or both of them to a predetermined OFDM symbol of frequency blocks included in the transmission slot.

In this case, radio resources to which any of the common control channel and the control signaling channel is not assigned are assigned another physical channel such as an after-mentioned shared channel, for example. Accordingly, by assigning a plurality of common control channels, control signaling channels or both of them, the common control channels and the control signaling channels can be transmitted using the entire band, so that receiving quality can be improved due to frequency diversity effect.

Next, a case where frequency multiplexing is used together is described. In this case, a transmission method is described in a case where the frequency multiplexing is used together with the time multiplexing when the number of physical channels that can be multiplexed is small by applying only the before-mentioned time multiplexing.

The transmission apparatus in the case where frequency multiplexing is used together is different from the transmission apparatus described with reference FIG. 8 in that the configuration of the radio resource assignment unit 140 is different. The radio assignment unit 140 includes a sub-carrier mapping unit 134 connected to spreading units 106 and 116, and a sub-carrier mapping control unit 135 connected to the sub-carrier mapping unit 134. The sub-carrier mapping unit 134 is connected to the IFFT unit 150.

The sub-carrier mapping control unit 135 determines sub-carriers for mapping common control channels and control signaling channels, and supplies the result to the sub-carrier mapping unit 134. The sub-carrier mapping unit 134 performs mapping for the common control channels and control signaling channels based on the supplied information on the sub-carriers.

Figure 11A:
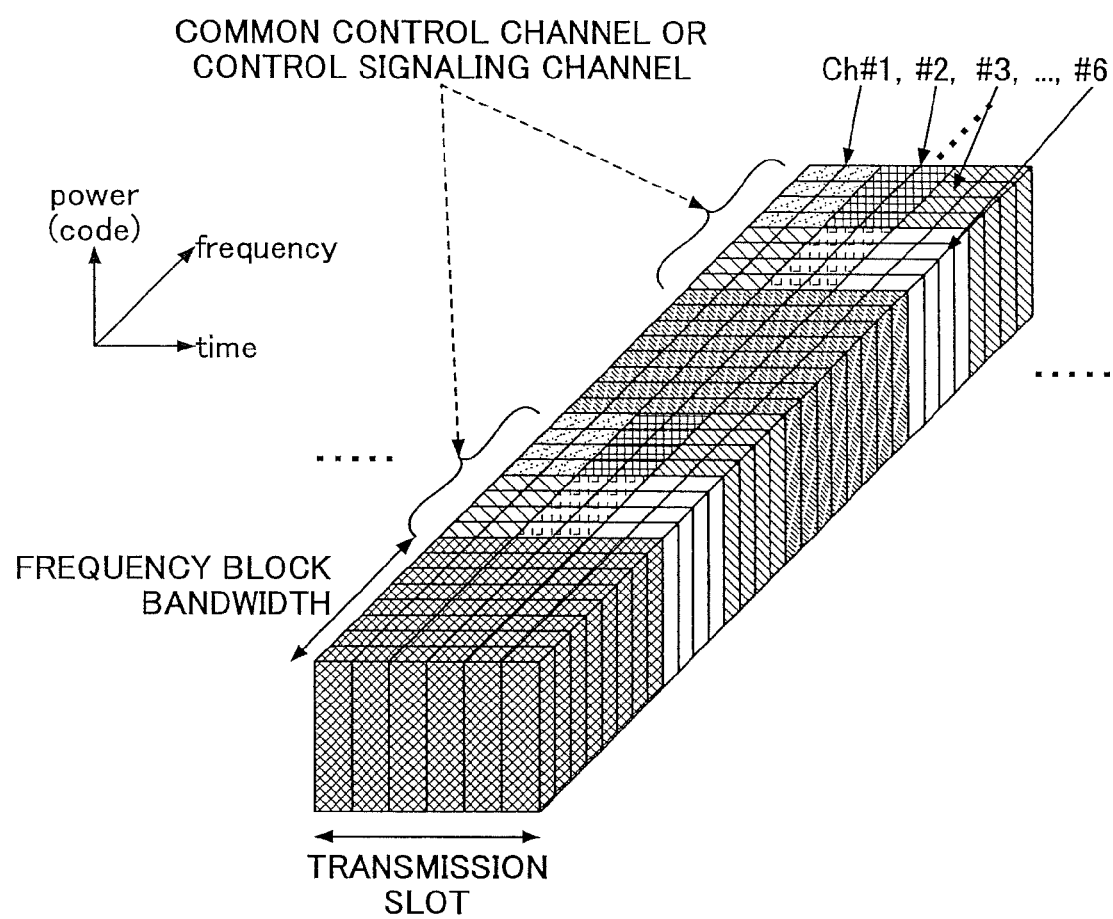
FIG. 11A is an explanatory diagram showing an example of combined use of frequency multiplexing.

For example, as shown in FIG. 11A, the sub-carrier mapping control unit 135 divides a frequency band of each frequency block into a plurality of bands to assign the common control channels and the control signaling channels in units of divided band. Further, the sub-carrier mapping control unit 135 may divide the time domain of the frequency blocks into a plurality of domains to change the common control channels and the control signaling channels to be assigned to each divided time domain in a time division manner.

For example, when dividing a frequency band in each of selected frequency blocks into two bands and dividing a transmission slot into three, the sub-carrier mapping control unit 135 assigns the common control channels, control signaling channels or both of them to the divided blocks, for example, to channels #1, #2, #3, . . . #6.

By using a plurality of frequency blocks in this way, and by assigning the common control channels and the control signaling channels to bands divided from the frequency band in each frequency block, the receiving quality in the receiver can be improved due to frequency diversity effect.

Figure 11B:
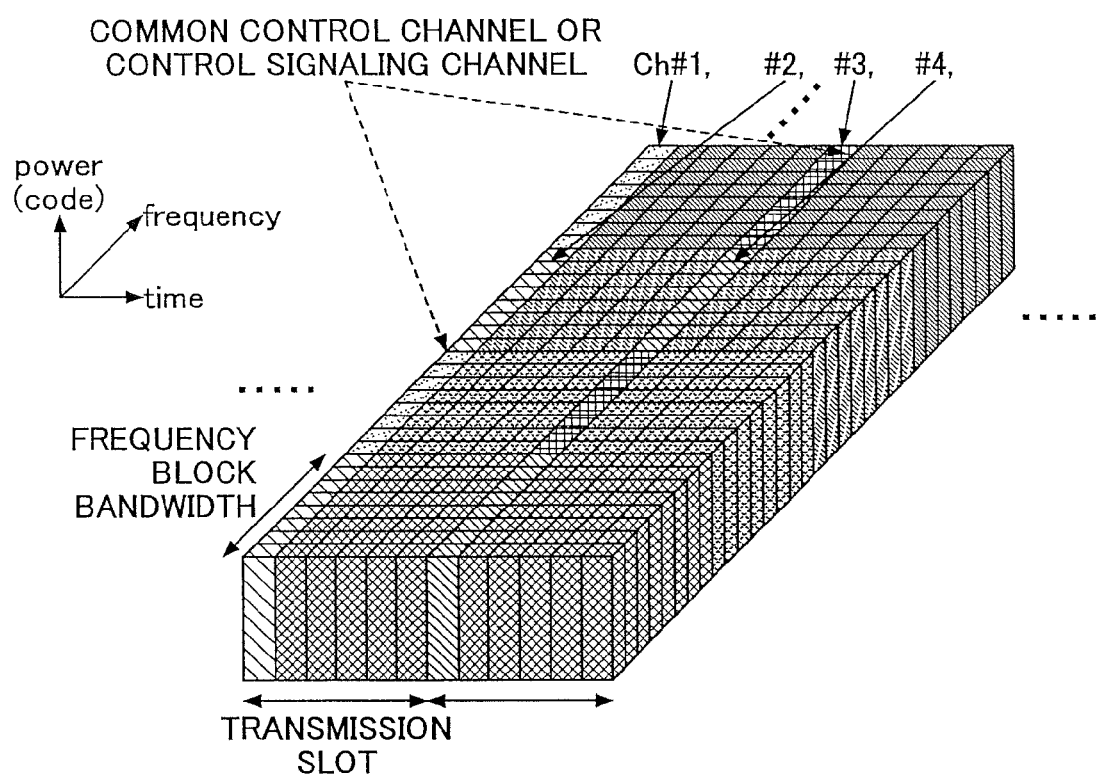
FIG. 11B is an explanatory diagram showing an example of combined use of frequency multiplexing.

In addition, for example, as shown in FIG. 11B, the sub-carrier mapping control unit 135 may assign, at a transmission slot level, the common control channels, the control signaling channels or both of them to a predetermined OFDM symbol of frequency blocks included in the transmission slot, as channels #1, #2, #3, and #4 for example.

For example, the sub-carrier mapping control unit 135 assigns the common control channels, the control signaling channels or both of them to a predetermined OFDM symbol in assigned frequency blocks. In this case, radio resources to which any of the common control channel and the control signaling channel is not assigned are assigned another physical channel such as an after-mentioned shared channel, and switching is performed in a time division manner.

Accordingly, by assigning the common control channels, the control signaling channels or both of them at the frequency block level, the common control channels and the control signaling channels can be transmitted using discrete parts over the entire band, so that receiving quality can be improved due to frequency diversity effect.

Next, a case where code multiplexing is used together is described.

The transmission apparatus in the case where code multiplexing is used together is different from the transmission apparatus described with reference to FIG. 8 in that the configuration of the radio resource assignment unit 140 is different. The radio assignment unit 140 includes a code multiplexing unit 137 connected to spreading units 106 and 116, and a code multiplexing control unit 136 connected to the code multiplexing unit 137. The code multiplexing unit 137 is connected to the IFFT unit 150.

The code multiplexing control unit 136 performs control for code-multiplexing output signals, from the spreading units 106 and 116, that are spread with different spreading codes. The code multiplexing unit 137 performs code multiplexing on input channels.

Figure 13:
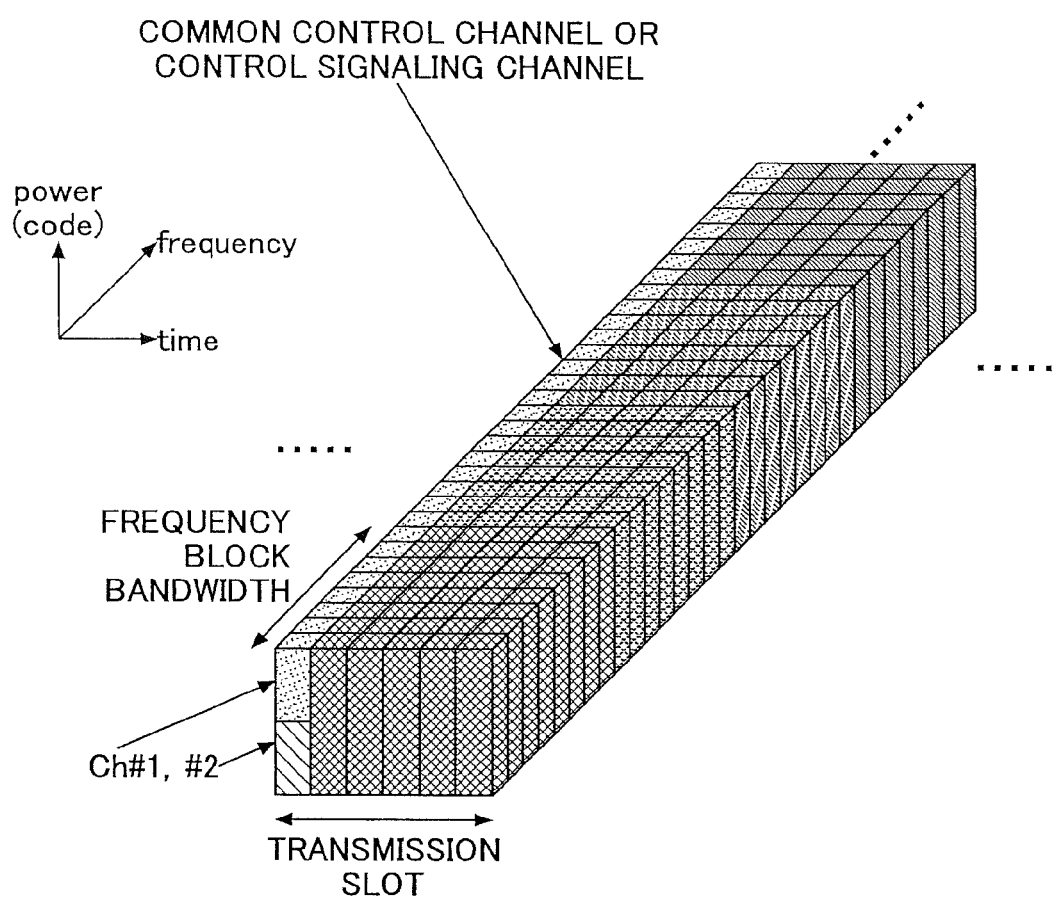
FIG. 13 is an explanatory diagram showing an application example of code multiplexing.

For example, as shown in FIG. 13, the code multiplexing control unit 136 assigns each of the common control channels, the control signaling channels or both of them as channels #1, #2 for example, to a predetermined OFDM symbol in OFDM symbols included in a transmission slot at a transmission slot level, so as to perform code multiplexing.

In this case, radio resources to which any of the common control channel and the control signaling channel is not assigned are assigned another physical channel such as an after-mentioned shared channel for example.

Accordingly, by using a plurality of frequency blocks to perform code-multiplexing for the common control channel and the control signaling channel, receiving quality can be improved due to frequency diversity effect.

Next, assignment of radio resources for the shared channel is described.

Since the shared channel is information directed to each user, packet scheduling can be applied. As to the frequency axis direction, the radio resource assignment unit 140 divides the entire frequency band assigned to the system in units of one sub-carrier or a plurality of sub-carriers, as to the time axis direction, the radio resource assignment unit 140 divides in units of one or a plurality of OFDM symbols, and divides the code axis direction in units of one or a plurality of codes, so that each frequency block is configured by one or a plurality sub-carries, one or a plurality of OFDM symbols, and one or a plurality of codes, and radio resources are assigned in units of the frequency block.

In addition, the radio resource assignment unit 140 performs packet scheduling for the time domain and the frequency domain to select at least one frequency block from among a plurality of frequency blocks. The result of packet scheduling is reported to a receiving station.

In addition, the radio resource assignment unit 140 assigns optimum frequency blocks based on feedback information, from the receiving station, that is a receiving channel status for example, that is a receiving SIR, for example.

Accordingly, frequency blocks to be assigned to each user can be dynamically changed, so that frequency blocks corresponding to good channel status can be assigned.

Accordingly, receiving characteristics in the receiver can be improved due to a multi-user diversity effect.

Figure 14:
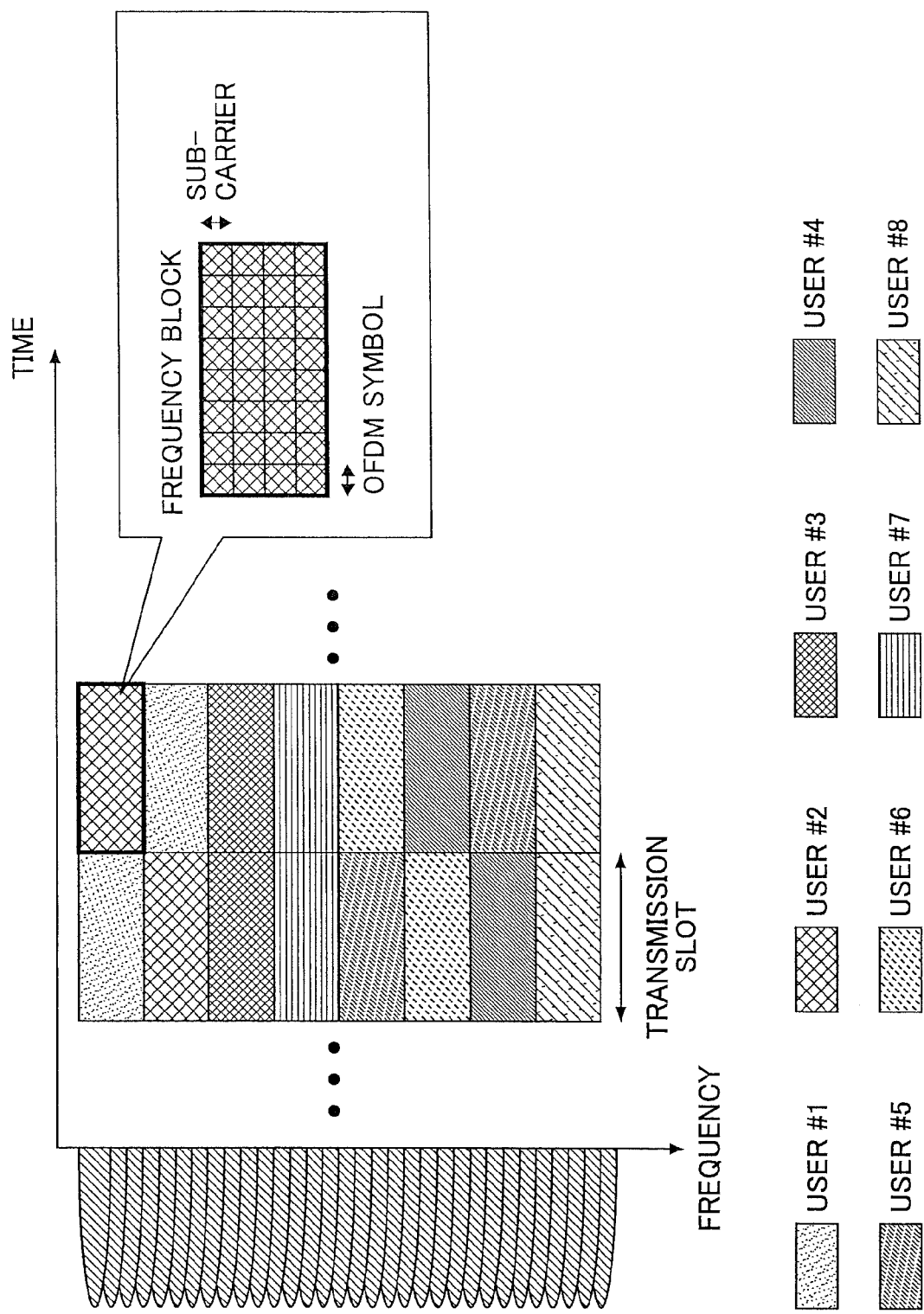
FIG. 14 is an explanatory diagram showing radio resource assignment to the shared channel.

As an example, a case where the number of users is eight is described with reference to FIG. 14. That is, a case is described where shared channels for the eight users are assigned to radio resources.

The radio resource assignment unit 140 divides the entire frequency band assigned to the system into eight, for example, to form frequency blocks, and perform radio resource assignment for each transmission slot according to receiving status of each user. Here, the frequency block is a radio resource assignment unit formed when dividing the system band into a plurality of bands in each transmission slot.

In addition, for example, when information amounts to be transmitted for each user are different, the radio resource assignment unit 140 may assign the frequency block according to a data rate. For example, the frequency block is assigned according to a signal of a high data rate that is, for example, download of a large sized file, and a signal of a low transmission rate such as voice. In this case, in the case of the high data rate, "size of a packet desired to be transmitted" becomes larger than the size of the frequency block. In the case of the low data rate, "size of a packet desired to be transmitted" becomes smaller than the size of the frequency block.

Figure 15:
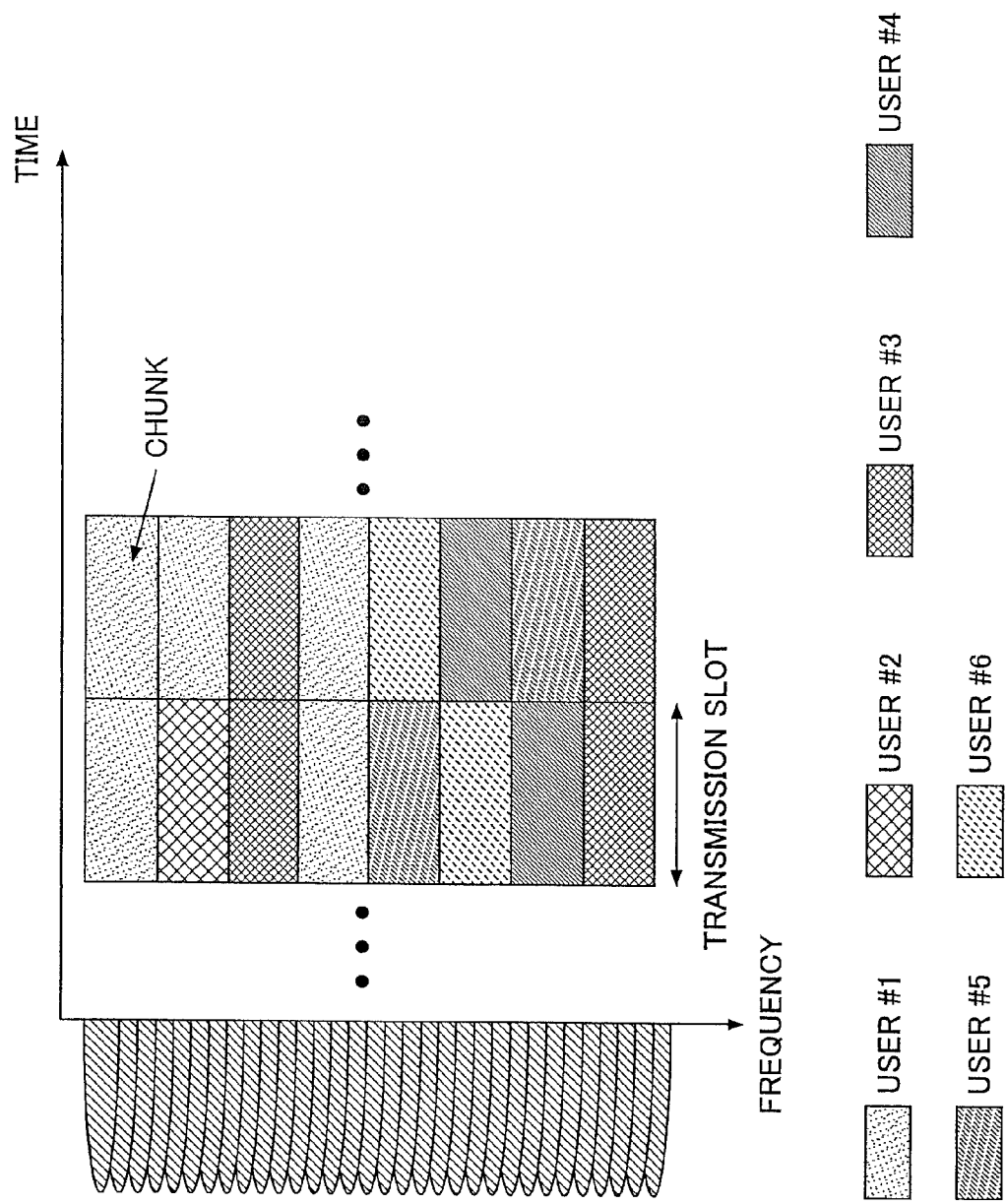
FIG. 15 is an explanatory diagram showing radio resource assignment to the shared channel.

A case where radio resources are assigned to a user of the high data rate is described with reference to FIG. 15.

In the case of the high data rate, since "size of a packet desired to be transmitted" is larger than the size of the frequency block, the radio resource assignment unit 140 assigns a plurality of frequency blocks (chunks) in a transmission slot. For example, for a user #1 of the high data rate, three frequency blocks are assigned in a transmission slot, and four frequency blocks are assigned in another transmission slot.

Figure 16:
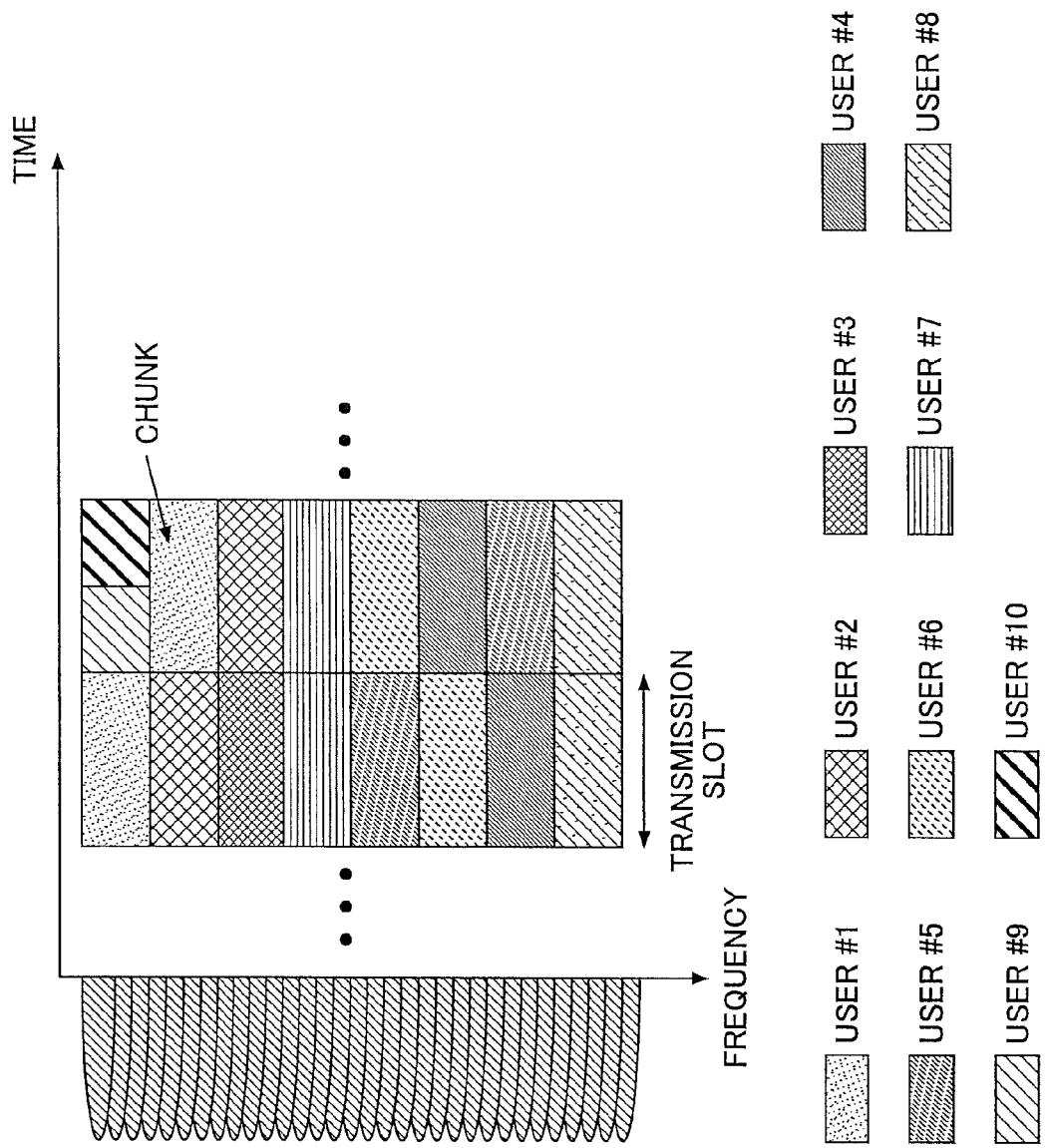
FIG. 16 is an explanatory diagram showing radio resource assignment to the shared channel.

Next, a case where radio resources are assigned to a user of the low data rate is described with reference to FIG. 16.

In the case of the low data rate, since "size of a packet desired to be transmitted" is smaller than the size of the frequency block, the radio resource assignment unit 140 assigns a batch of users of low data rate to one frequency block. For the user of the low data rate, since the "size of a packet desired to be transmitted" is smaller than the size of the frequency block, one block cannot be filled with information to be transmitted. However, it wastes radio resources to use only a part of the frequency block and keep remaining part empty for performing transmission.

Therefore, a plurality of users of the low speed data rate are assigned one frequency block. For example, the radio resource assignment unit 140 assigns users #9 and #10 of the low data rate to a same frequency block to transmit it by multiplexing the users. Accordingly, receiving quality can be improved due to multi-user diversity.

In addition, when assigning radio resources to users of the low data rate, the radio resource assignment unit 140 may assign the resources across at least two frequency blocks in a plurality of frequency blocks included in a same transmission slot. When users of the low data rate are assigned to one frequency block as a whole, there is a case where the multi-user diversity effect is deteriorated since a set of users of good receiving status is not necessarily assigned.

Figure 17A:
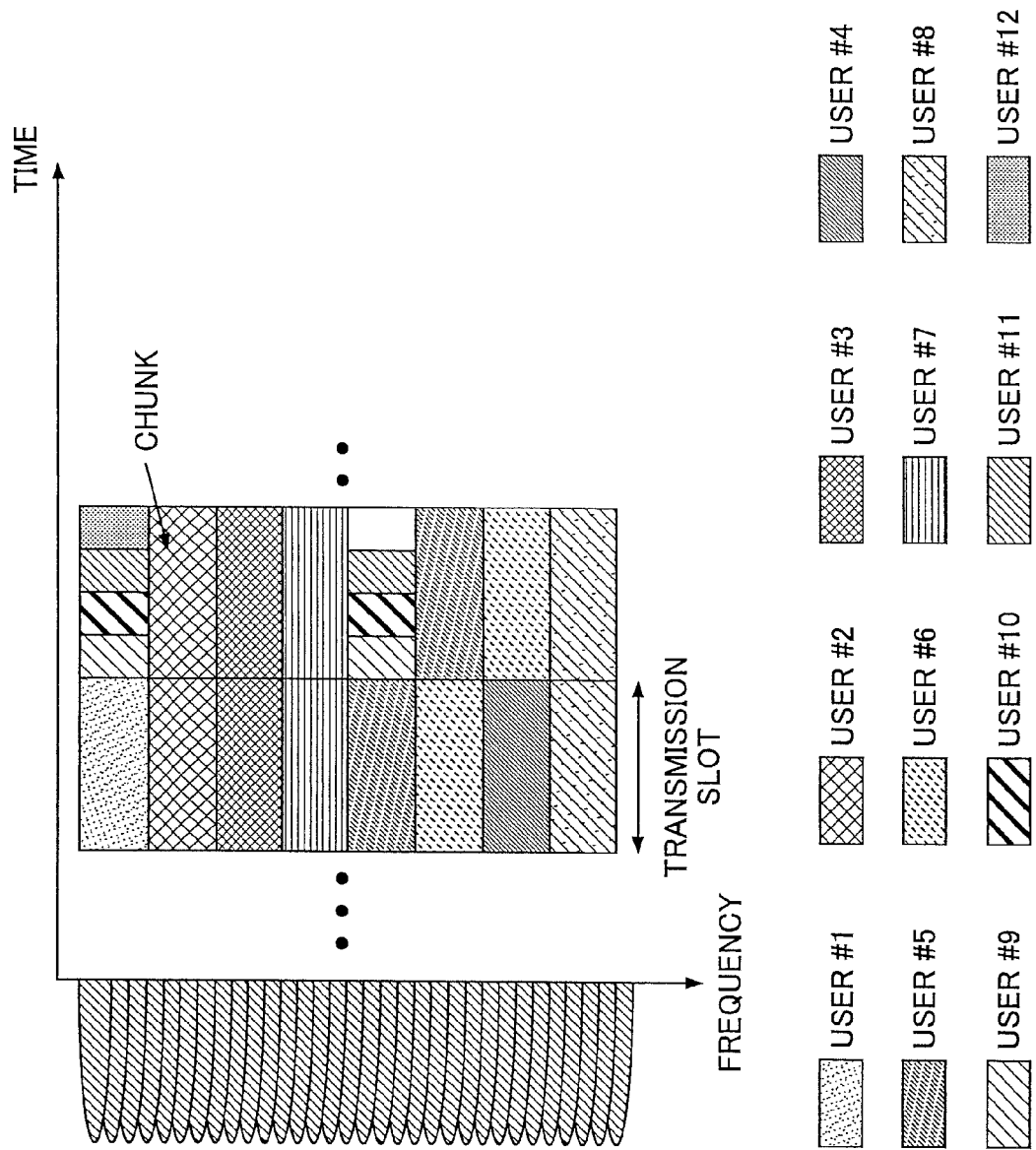
FIG. 17A is an explanatory diagram showing radio resource assignment to the shared channel.

In such a case, radio resources are assigned across a plurality of frequency blocks. For example, as shown in FIG. 17A, each of users #9, #10, #11 and #12 of the low data rate is assigned across at least two frequency blocks of frequency blocks included in a same transmission slot. Accordingly, frequency diversity effect can be obtained, and receiving quality in the receiver can be improved.

Figure 17B:
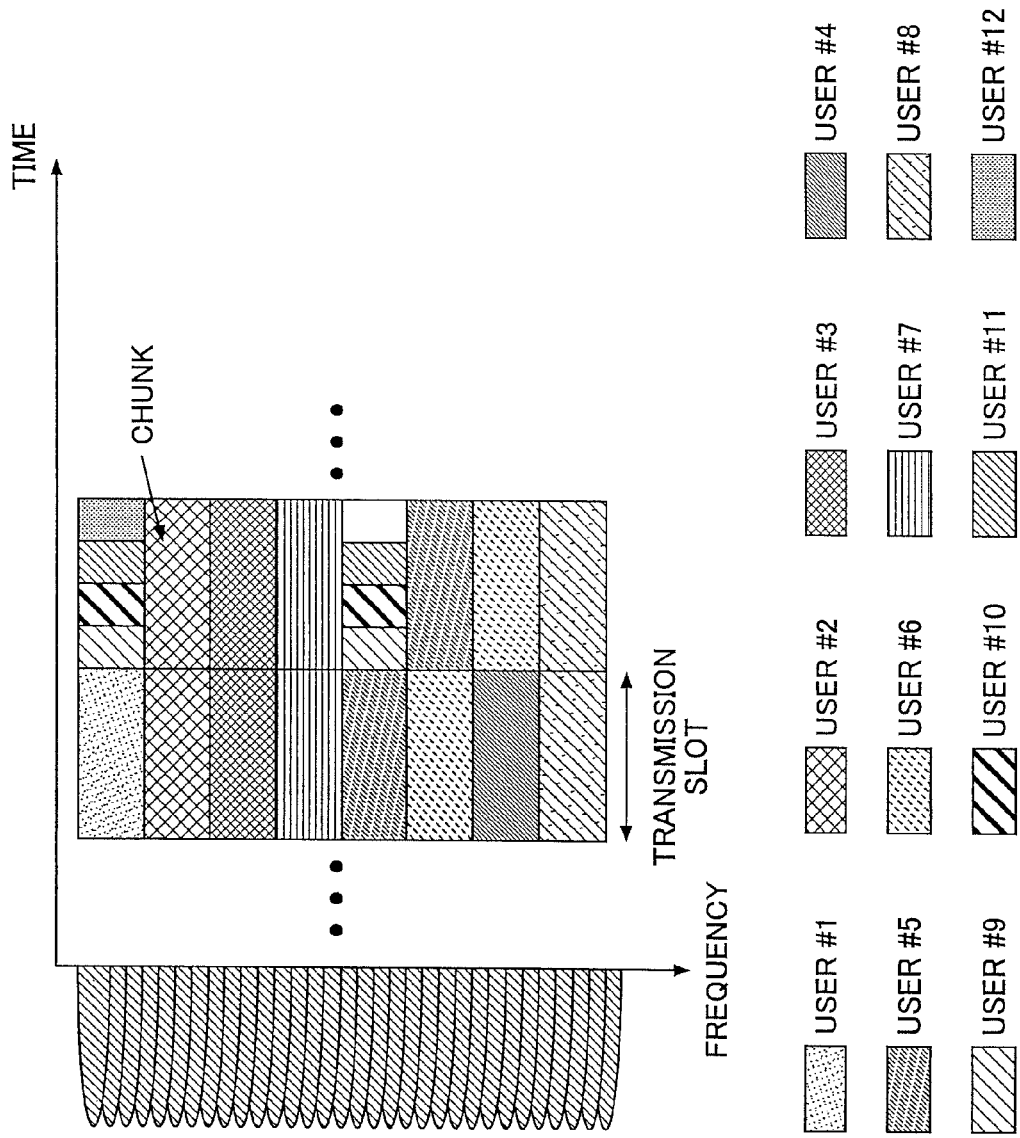
FIG. 17B is an explanatory diagram showing radio resource assignment to the shared channel.

Although radio resource assignment to shared channels for users of low data rate is described in FIG. 17A, a similar radio resource assignment method is effective when performing assignment for users moving at high speed or users where receiving status is extremely bad. This is because, since speed of channel variation becomes very high for the users moving at high speed, radio resource assignment by packet scheduling cannot follow the variation so that improvement effect due to multi-user diversity cannot be obtained. In addition, as to the users where the receiving status is extremely bad, since the data rate becomes very low, enough channel coding gain cannot be obtained only by assigning a part of a particular frequency block, so that there may be a case where the characteristics are deteriorated. The user in the above-mentioned conditions, as shown in FIG. 17B, is assigned resources across at least two frequency blocks of frequency blocks included in a same transmission slot. Accordingly, frequency diversity effect can be obtained so that receiving quality in the receiver can be improved.

Next, a case where radio resources are assigned to a multicast channel is described with reference to FIG. 18. In the case of multicast, data is transmitted from a plurality of transmitters to a particular user.

As shown in the configuration example 1, when assigning radio resources to a multicast channel, the radio resource assignment unit 140 assigns the multicast channel to at least a part of symbols forming a transmission slot that indicates a unit (TTI: Transmission Time Interval) of transmission in packet transmission.

Also, in this case, when assigning radio resources to a physical channel other than the multicast channel, the radio resource assignment unit 140 assigns a symbol other than symbols to which the multicast channel is assigned. Accordingly, since the multicast channel can be mapped over the entire frequency band, receiving quality in the receiver can be improved due to frequency diversity effect.

As shown in the configuration example 2, when assigning radio resources to a multicast channel, the radio resource assignment unit 140 may assign the multicast channel to at least a part of symbols forming a transmission slot that indicates a unit (TTI: Transmission Time Interval) of transmission in packet transmission, and may perform assignment so as to transmit a same transmission slot a plurality of times, for example, two times, using a plurality of transmission slots.

Also, in this case, when assigning radio resources to a physical channel other than the multicast channel, the radio resource assignment unit 140 assigns a symbol other than symbols to which the multicast channel is assigned. Accordingly, since the multicast channel can be mapped over the entire frequency band, receiving quality in the receiver can be improved due to frequency diversity effect. In addition, effect of time diversity can be also obtained.

In addition, in the configuration example 2, in the multicast channel transmitted secondly or later, information that is the same as one transmitted first is transmitted. In this case, demodulation processing is performed in the receiver side so that it is determined whether there is an demodulation error. When there is no demodulation error, control is performed so as not to receive a multicast channel that is transmitted secondly or later. For example, in many cases, a user located near a transmitter can receive information at the first try. By controlling so as not to receive a multicast channel that is transmitted secondly or later, consumption of a battery can be suppressed.

When there is a demodulation error, the information is discarded and the multicast channel transmitted secondly or later is demodulated again. In addition, when there is a demodulation error, the information may not be discarded so as to perform packet combining for the multicast channel transmitted secondly or later and the multicast channel received previously to perform demodulation again. Accordingly, receiving SIR can be improved.

In addition, in the configuration example 2, the multicast channel transmitted secondly or later may be for transmitting information different from one in the first transition. For example, the multicast channel transmitted secondly or later may be configured to transmit a packet on which puncturing is performed with a pattern different from a pattern used in the first transmission. In this case, demodulation processing is performed in the receiver side, and it is determined whether there is a demodulation error. When there is no demodulation error, the receiver is controlled such that it does not receive a multicast channel transmitted secondly or later. For example, in many cases, a user located near a transmitter can receive information at the first try. By controlling the user so as not to receive a multicast channel that is transmitted secondly or later, consumption of a battery can be suppressed.

When there is a demodulation error, the information may not be discarded, and packet combining may be performed between the multicast channel transmitted secondly or later and the multicast channel received previously to perform demodulation again. Accordingly, coding gain can be improved.

In addition, in the configuration example 2, the multicast channel transmitted secondly or later may be configured to transmit information different from one sent in the first transmission. For example, information indicating the multicast channel may be divided into two or more. When information is stored in the multicast channel transmitted for the first time and redundancy code is stored in the multicast channel transmitted secondly or later, the multicast channel transmitted secondly or later cannot be decoded when receiving of the multicast channel transmitted first is failed.

In such a case, by dividing information indicating the multicast channel into two or more for transmission, receiving quality in the receiver can be improved due to time diversity effect. In this case, a transmission slot for transmitting information indicating the multicast channel by dividing it and a packet storing the redundancy code may be transmitted.

In this case, it is necessary to determine a number of division of the multicast channel beforehand in the transmitter and the receiver. As information to be determined beforehand, a packet number for performing packet combining, a puncture pattern, constellation, and a bit indicating new or retransmission packet are necessary. The bit indicating a new or retransmitted packet is necessary for avoiding incorrect combining considering ACK/NACK bit error.

Next, a method for assigning radio resources for a shared channel in a frequency block is described. The radio resource assignment unit 140 multiplexes shared channels in a frequency block to which the radio resources are assigned.

First, a method is described for assigning radio resources to a user of high data rate.

Figure 19:
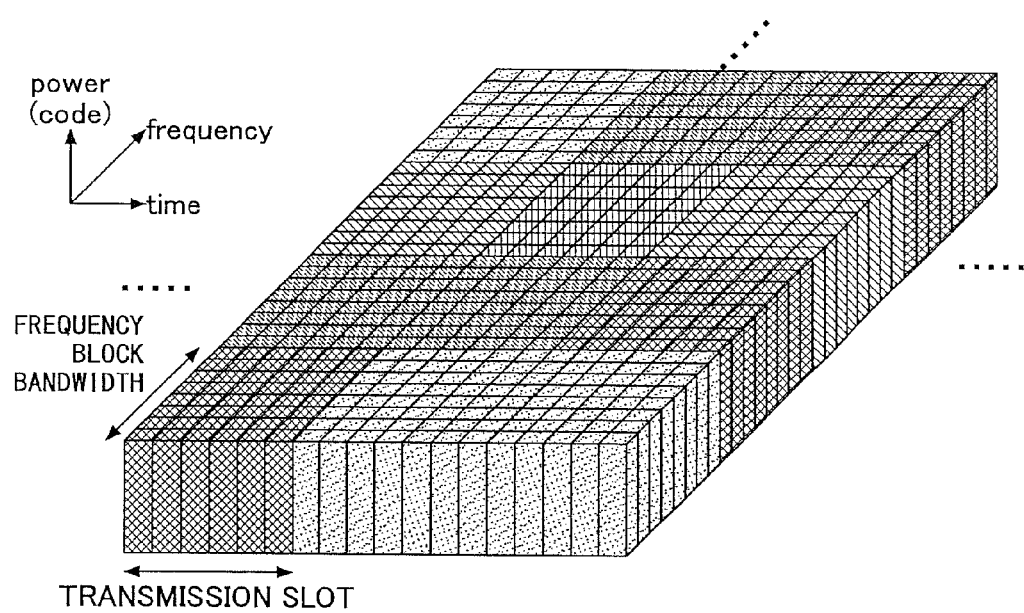
FIG. 19 is an explanatory diagram showing multiplexing of high data rate users.

For example, for a user of the high speed data rate, the radio resource assignment unit 140 multiplexes signals of one user within the frequency block based on the result of frequency/time scheduling. For example, as shown in FIG. 19, the radio resource assignment unit 140 combines time multiplexing and frequency multiplexing to multiplex signals of one user.

Figure 20:
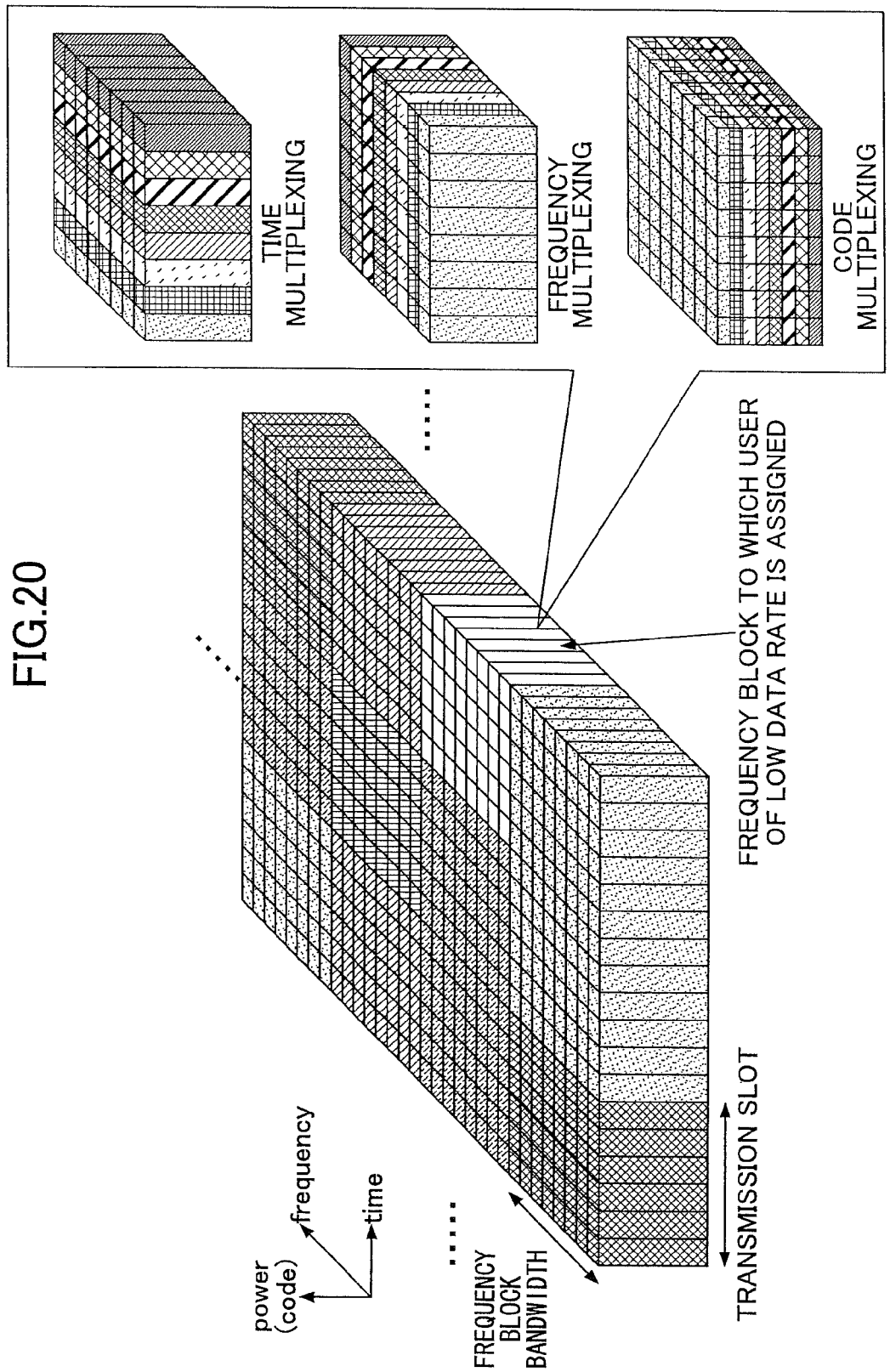
FIG. 20 is an explanatory diagram showing multiplexing of low data rate users.

Next, a method for assigning radio resources to users of low data rate is described with reference to FIG. 20.

For example, for the user of low data rate, the radio resource assignment unit 140 time-multiplexes signals of a plurality of users within a frequency block based on the result of frequency/time scheduling. Accordingly, receiving quality can be improved due to frequency diversity effect.

In addition, for example, for the user of the low data rate, the radio resource assignment unit 140 may frequency-multiplex signals of a plurality of users within a frequency block based on the result of frequency/time scheduling. Accordingly, receiving quality can be improved due to time diversity effect.

In addition, for example, for the user of the low data rate, the radio resource assignment unit 140 may code-multiplex signals of a plurality of users within a frequency block based on the result of frequency/time scheduling. Accordingly, compared to time multiplexing and frequency multiplexing, time diversity effect and frequency diversity effect can be obtained so that receiving quality can be improved. In addition, by applying a low speed data modulation scheme such as QPSK and BPSK for example, effect of inter-code interference caused by collapse of orthogonally can be decreased.

In addition, for example, for the user of the low data rate, the radio resource assignment unit 140 may multiplex signals of a plurality of users within the frequency block by combining time multiplexing, frequency multiplexing and code multiplexing based on the result of frequency/time scheduling.

Detailed descriptions are given.

Figure 21:
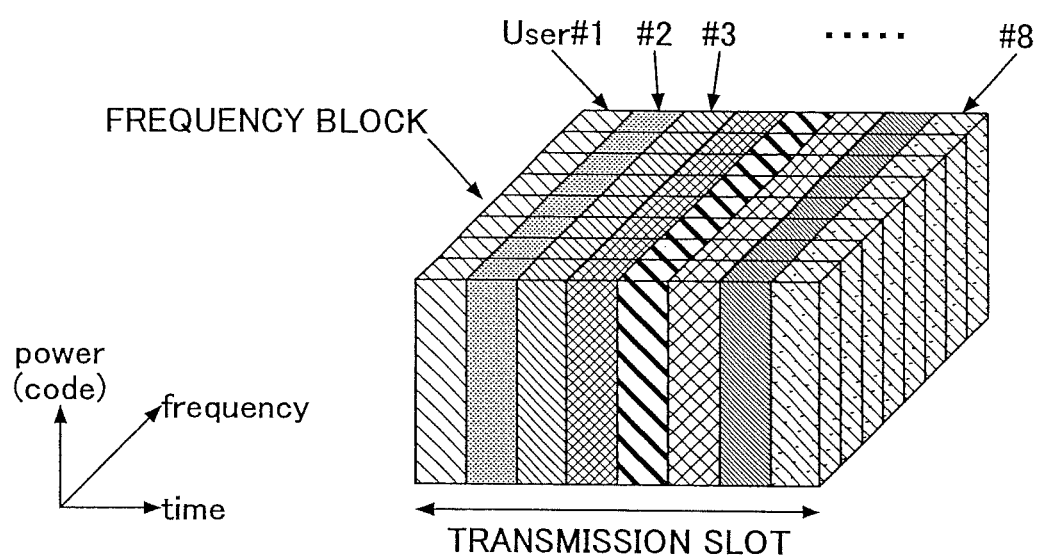
FIG. 21 is an explanatory diagram showing multiplexing of low data rate users.

As mentioned above, as shown in FIG. 21, the radio resource assignment unit 140, for users of the low data rate, time-multiplexes signals of users within the frequency block. Accordingly, especially in an environment where there are many users of low speed mobility, receiving quality can be improved by the frequency diversity effect.

Figure 22A:
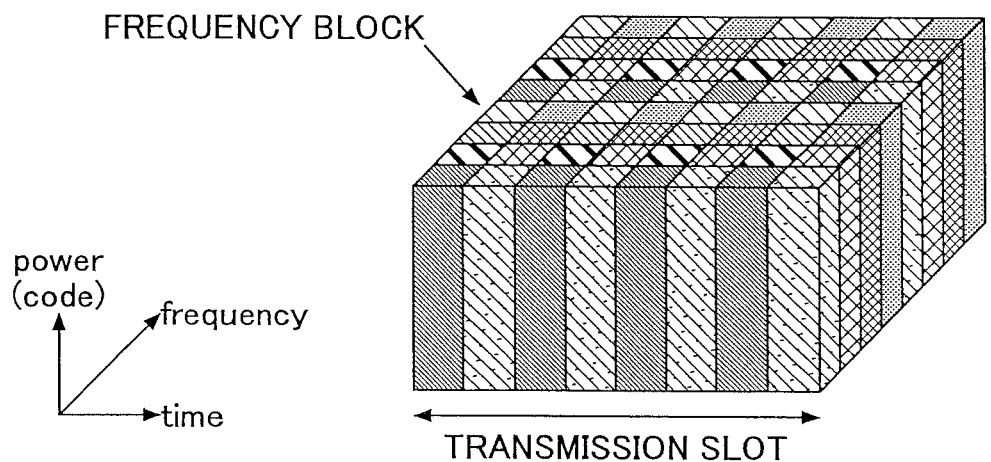
FIG. 22A is an explanatory diagram showing multiplexing of users of high speed mobility.

On the other hand, as shown in FIG. 22A, the radio resource assignment unit 140, for users of the high data rate, multiplexes signals of users within the frequency block by combining time multiplexing and frequency multiplexing.

Figure 22B:
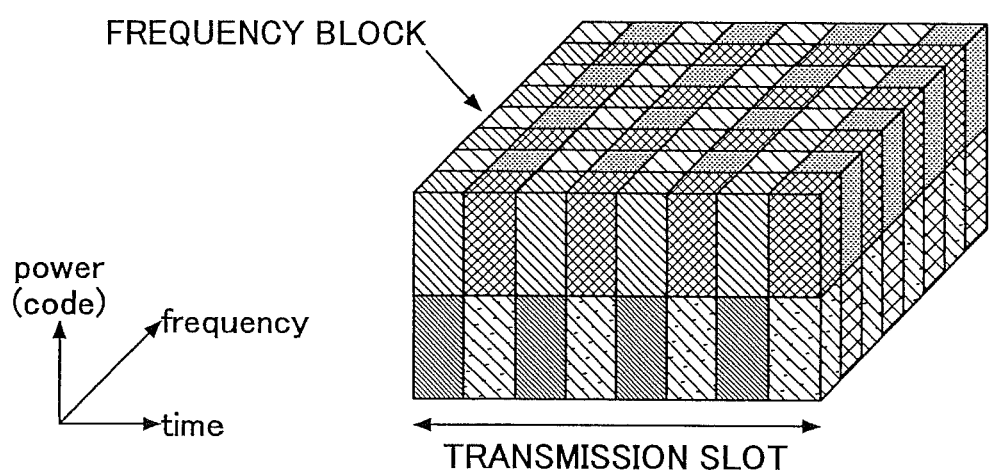
FIG. 22B is an explanatory diagram showing multiplexing of users of high speed mobility.

In addition, as shown in FIG. 22B, the radio resource assignment unit 140, for users of the high data rate, may multiplex signals of users within the frequency block by combining time multiplexing and code multiplexing.

In addition, the radio resource assignment unit 140, further for users of the low data rate, may multiplex signals of users within the frequency block by combining time multiplexing, frequency multiplexing and code multiplexing.

Figure 23A:
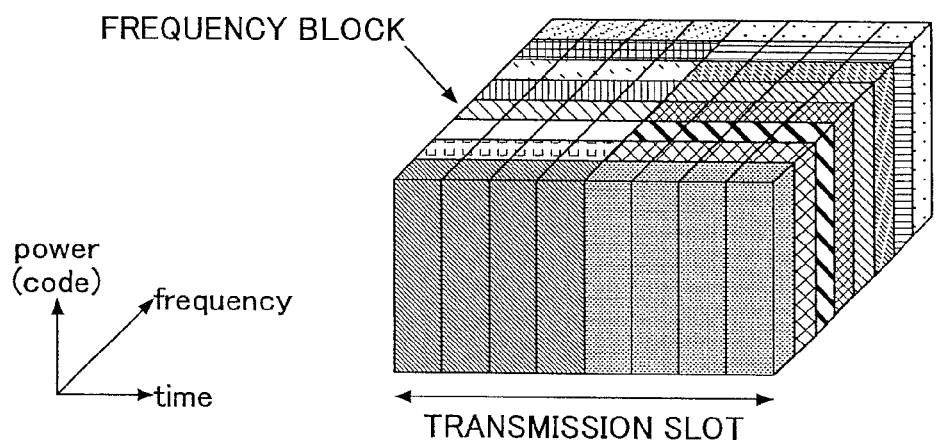
FIG. 23A is an explanatory diagram showing multiplexing of users of low speed mobility.
Figure 23B:
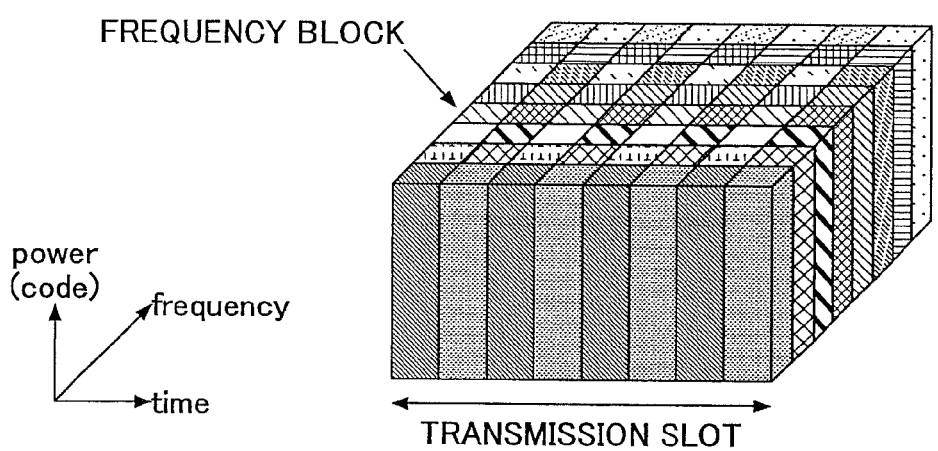
FIG. 23B is an explanatory diagram showing multiplexing of users of low speed mobility.

For example, as shown in FIGS. 23A and 23B, the radio resource assignment unit 140 multiplexes signals of a plurality of users within the frequency block in the time domain/the frequency domain. FIG. 23A corresponds to a case where continuous time domains are assigned, and FIG. 23B corresponds to a case where discrete time domains are assigned.

Figure 24:
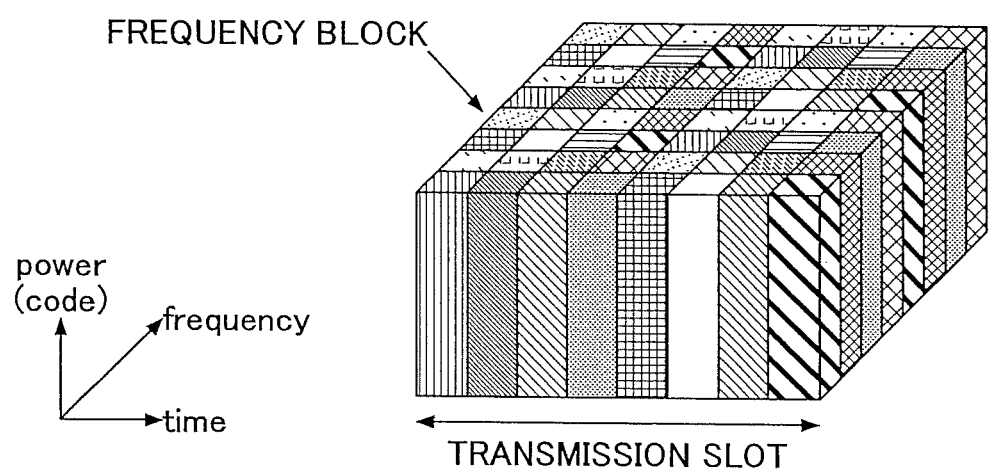
FIG. 24 is an explanatory diagram showing multiplexing of low data rate users.

In addition, for example, as shown in FIG. 24, the radio resource assignment unit 140 may randomly select blocks formed by sub-carriers and OFDM symbols in time domain/frequency domain to multiplex signals of a plurality of users in the frequency block.

Figure 25A:
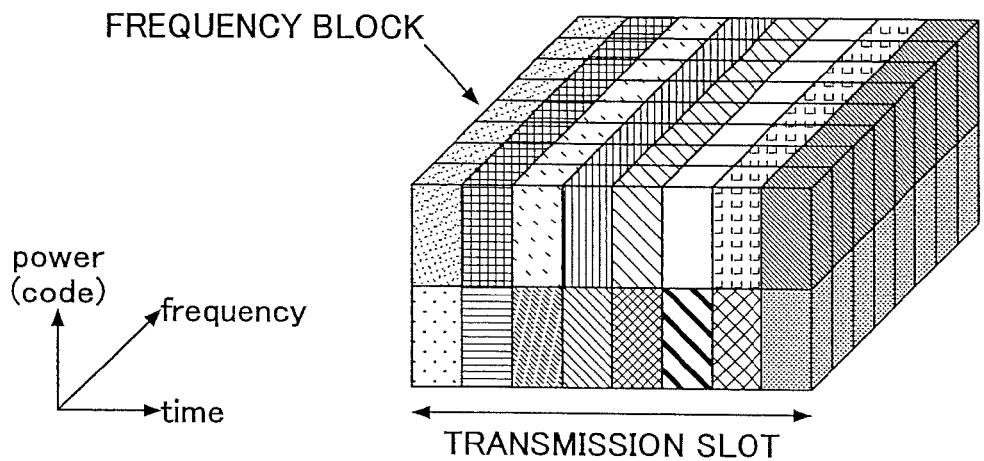
FIG. 25A is an explanatory diagram showing multiplexing of low data rate users.
Figure 25B:
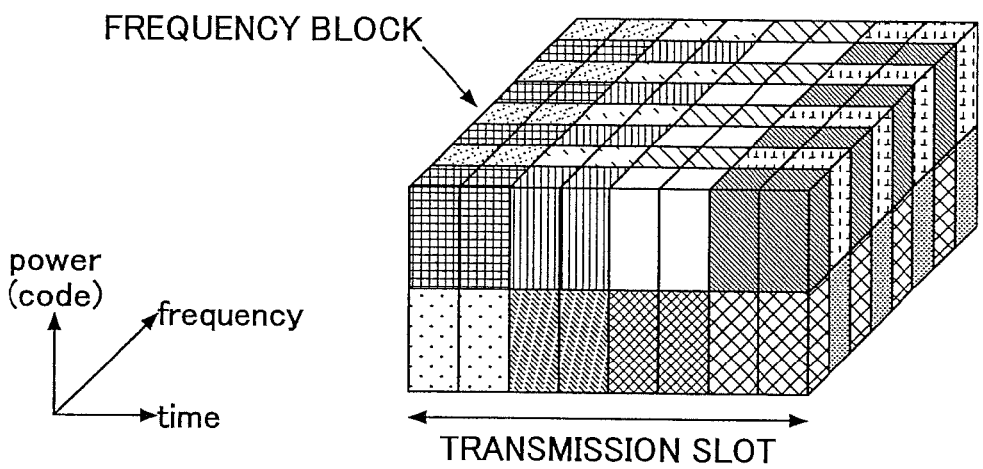
FIG. 25B is an explanatory diagram showing multiplexing of low data rate users.

In addition, for example, as shown in FIGS. 25A and 25B, the radio resource assignment unit 140 may multiplex signals of a plurality of users in the frequency block in time domain/code domain. FIG. 25A corresponds to a case where consecutive frequency domains are assigned (Hybrid TDM/CDM), and FIG. 25B corresponds to a case where discrete frequency domains are assigned (Hybrid TDM/CDM).

Figure 26A:
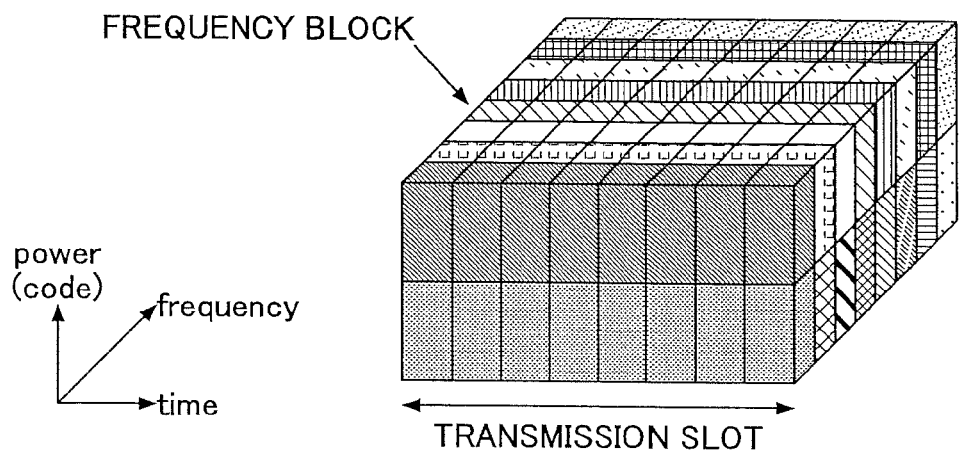
FIG. 26A is an explanatory diagram showing multiplexing of low data rate users.
Figure 26B:
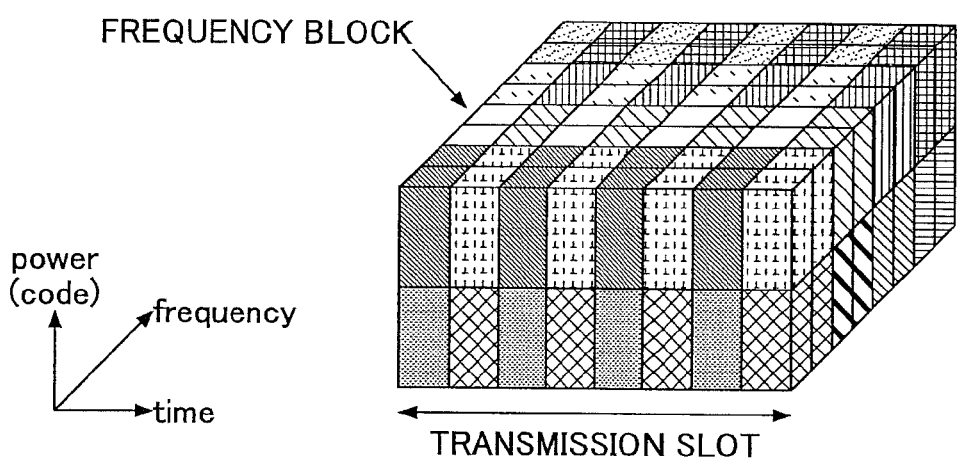
FIG. 26B is an explanatory diagram showing multiplexing of low data rate users.

In addition, for example, as shown in FIGS. 26A and 26B, the radio resource assignment unit 140 may multiplex signals of a plurality of users in the frequency block in frequency domain/code domain. FIG. 26A corresponds to a case where consecutive time domains are assigned (Hybrid FDM/CDM), and FIG. 26B corresponds to a case where discrete time domains are assigned (Hybrid FDM/CDM).

Figure 27A:
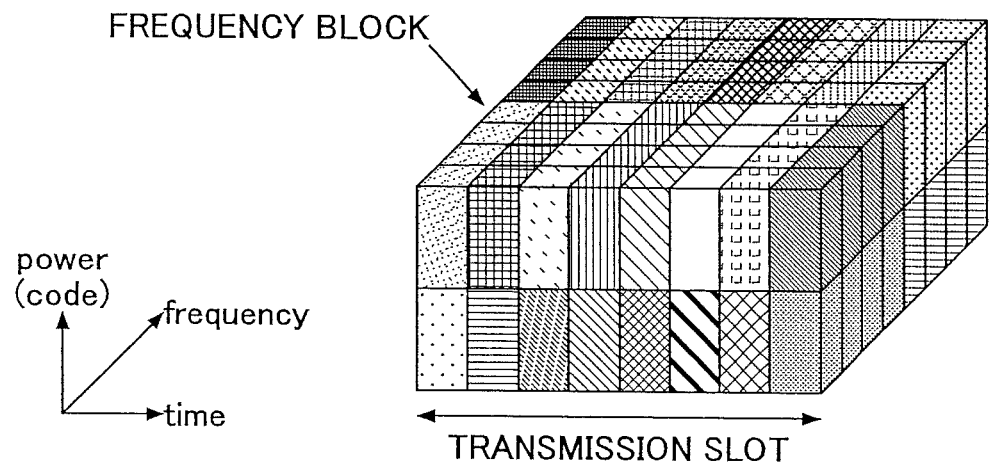
FIG. 27A is an explanatory diagram showing multiplexing of low data rate users.
Figure 27B:
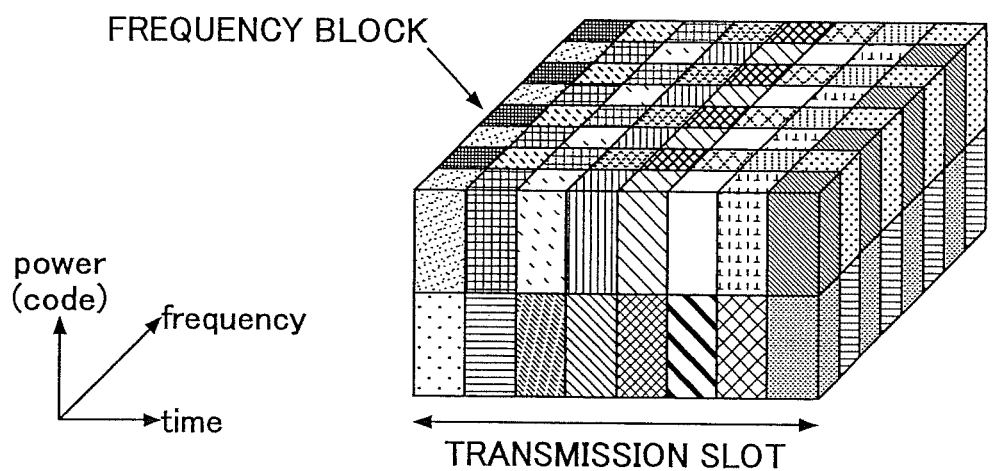
FIG. 27B is an explanatory diagram showing radio resource assignment to the shared channel.

In addition, for example, as shown in FIGS. 27A and 27B, the radio resource assignment unit 140 may multiplex signals of a plurality of users in the frequency block in time domain/frequency domain/code domain. FIG. 27A corresponds to a case where consecutive frequency domains are assigned (Hybrid TDM/FDM/CDM), and FIG. 27B corresponds to a case where discrete frequency domains are assigned (Hybrid TDM/FDM/CDM).

As mentioned above, by dividing the time domain/frequency domain/code domain in the frequency block and assigning a signal of a user to each divided region, multiplexing among a plurality of users in the frequency block can be performed.

Next, operation of the transmission apparatus 100 of the present invention is described with reference to FIG. 28.

Information to be transmitted by a common control channel is supplied to the channel coding unit 102. In the channel coding unit 102, channel coding is performed on the supplied information according to a preset channel coding rate (step S2702).

Next, in data modulation unit 104, data modulation is performed on information, on which channel coding has been performed, according to a preset data modulation scheme (step S2704).

Next, the spreading unit 106 spreads information on which data modulation has been performed according to a preset spreading rate (step S2706).

On the other hand, the packet scheduling unit 128 selects users and determines a data modulation scheme and a coding rate used for each selected user according to supplied transmission information to each user and receiving quality of each user (step S2708).

Next, in channel coding unit 122, channel coding is performed on information to be transmitted to each user according to the coding rate determined by the packet scheduling unit 128 (step S2710).

Next, in the data modulation unit 104, data modulation is performed on information, to be transmitted to each user, on which channel coding has been performed, according to the data modulation scheme determined by the packet scheduling unit 128 (step S2712).

Next, the spreading unit 106 spreads information, to be transmitted to each user, on which data modulation has been performed, according to the spreading factor determined by the packet scheduling unit 128 (step S2714).

In addition, the packet scheduling unit 128 supplies information of the selected user and information such as selected data modulation scheme and coding rate etc. to the channel coding unit 112.

In the channel coding unit 112, channel coding is performed on supplied information according to a preset channel coding rate (step S2716).

Next, in the data modulation unit 104, data modulation is performed on the information on which channel coding has been performed according to a preset data modulation scheme (step S2718).

Next, the spreading unit 106 spreads information on which data modulation has been performed according to a preset spreading factor (step S2720).

Next, based on input information (decision criteria) used for assignment such as a channel type, a data rate, and mobility, etc., the radio resource assignment unit 140 assigns, to radio resources, information to be transmitted by the common control channel, information of selected users, information such as the selected data modulation scheme and the coding rate, and information to be transmitted to each user (step S2722).

Next, an OFDM signal is generated and transmitted (step S2724).

The present international application claims priority based on Japanese patent application No. 2005-105493, filed in the JPO on Mar. 31, 2005, and priority based on Japanese patent application No. 2005-174403, filed in the JPO on Jun. 14, 2005, and the entire contents of the applications of No. 2005-105493 and No. 2005-174403 are incorporated herein by reference.

INDUSTRIAL APPLICABILITY

The transmission apparatus and the radio resource assignment method of the present invention can be applied to a mobile communication system.

The invention claimed is:
1. A transmission apparatus comprising:
a first assignment unit configured to assign a common control channel to an OFDM symbol at a head part of a part of a plurality of frequency blocks, wherein each frequency block is formed by a plurality of subcarriers in a frequency domain and a plurality of OFDM symbols in a time domain, a length of the frequency block in the time domain corresponds to a transmission slot, and a plurality of frequency blocks are placed in the frequency domain over a system frequency band; and
a second assignment unit configured to assign a shared channel to a part other than the OFDM symbol to which the common control channel is assigned in the plurality of frequency blocks placed in the transmission slot,
wherein the first assignment unit assigns a channel for transmitting control information indicating a selected user to an OFDM symbol at a head part in a frequency block which is different from a frequency block to which the common control channel is assigned.
2. The transmission apparatus according to claim 1, further comprising a scheduling unit configured to assign a shared channel based on information indicating reception quality from each user.
3. A transmission apparatus comprising:
a first assignment unit configured to determine a frequency block to which a shared channel for each user is to be assigned, wherein the frequency block is formed by a plurality of subcarriers in a frequency domain and a plurality of OFDM symbols in a time domain, a length of the frequency block in the time domain corresponds to a transmission slot, and a plurality of frequency blocks are placed in the frequency domain over a system frequency band; and a second assignment unit configured to assign a multicast channel to a transmission slot to which the shared channel is not assigned, wherein, when assigning frequency blocks for one user to two or more consecutive transmission slots, the first assignment unit makes a determination so that a frequency block assigned to a first transmission slot and a frequency block assigned to a second transmission slot are separated by a predetermined gap, wherein the first assignment unit assigns a channel for transmitting control information indicating a selected user to an OFDM symbol at a head part in a frequency block which is different from a frequency block to which a common control channel is assigned.

4. An assignment method comprising:

assigning a common control channel to an OFDM symbol at a head part of a part of a plurality of frequency blocks, wherein each frequency block is formed by a plurality of subcarriers in a frequency domain and a plurality of OFDM symbols in a time domain, a length of the frequency block in the time domain corresponds to a transmission slot, and a plurality of frequency blocks are placed in the frequency domain over a system frequency band; and assigning a shared channel to a part other than the OFDM symbol to which the common control channel is assigned in the plurality of frequency blocks placed in the transmission slot, wherein the assigning the common control channel includes assigning a channel for transmitting control information indicating a selected user to an OFDM symbol at a head part in a frequency block which is different from a frequency block to which the common control channel is assigned.

5. An assignment method comprising:

determining a frequency block to which a shared channel for each user is to be assigned, wherein the frequency block is formed by a plurality of subcarriers in a frequency domain and a plurality of OFDM symbols in a time domain, a length of the frequency block in the time domain corresponds to a transmission slot, and a plurality of frequency blocks are placed in the frequency domain over a system frequency band; and assigning a multicast channel to a transmission slot to which the shared channel is not assigned, wherein, when assigning frequency blocks for one user to two or more consecutive transmission slots, the determining includes making a determination so that a frequency block assigned to a first transmission slot and a frequency block assigned to a second transmission slot are separated by a predetermined gap, wherein the determining includes assigning a channel for transmitting control information indicating a selected user to an OFDM symbol at a head part in a frequency block which is different from a frequency block to which a common control channel is assigned.

* * * * *